United States Patent [19]

Shirai et al.

[11] Patent Number: 6,158,822

[45] Date of Patent: Dec. 12, 2000

[54] METHOD AND APPARATUS FOR DIAGNOSING ELECTRICALLY OPERATED BRAKE WITHOUT MANUAL OPERATION OF BRAKE OPERATING MEMBER

[75] Inventors: Kenji Shirai, Mishima; Yasunori Yoshino; Akihiro Otomo, both of Toyota, all of Japan

[73] Assignee: Toyota Jidosha Kabushiki Kaisha, Toyota, Japan

[21] Appl. No.: 09/208,728

[22] Filed: Dec. 9, 1998

[30] Foreign Application Priority Data

Dec. 16, 1997 [JP] Japan .................................. 9-346629

[51] Int. Cl.⁷ .............................. B60T 8/00; B60T 17/22; B60T 13/74

[52] U.S. Cl. .............................. 303/3; 188/158; 188/162; 188/1.11 L; 188/181 T; 303/20; 303/122; 303/122.08; 303/122.03; 303/162; 303/112; 701/29; 318/362

[58] Field of Search ............................... 303/20, 3, 115.2, 303/162, 191, 152, 122.03, 122.08, 122, 121, 141, 142, 113.4, 155, 140; 318/362, 432, 433; 188/156, 158–165, 181 T, 1.11, 72.1; 701/29, 34, 70–78; 73/121; 192/13 R; 477/182

[56] References Cited

U.S. PATENT DOCUMENTS

| | | | |
|---|---|---|---|
| 4,708,406 | 11/1987 | Takagi et al. | 303/122.08 |
| 4,998,782 | 3/1991 | Thatcher et al. | 303/142 |
| 5,558,414 | 9/1996 | Kubota | 303/122.08 |
| 5,707,115 | 1/1998 | Bodie et al. | 188/158 |
| 5,707,117 | 1/1998 | Hu et al. | 303/122.08 |
| 5,758,930 | 6/1998 | Schiel et al. | 303/162 |
| 5,941,612 | 8/1999 | Carpenter | 303/122 |
| 5,957,246 | 9/1999 | Suzuki | 188/158 |
| 5,984,432 | 11/1999 | Otomo et al. | 303/162 |
| 6,000,507 | 12/1999 | Böhm et al. | 188/158 |
| 6,008,604 | 12/1999 | Maisch | 318/362 |
| 6,040,665 | 3/2000 | Shirai et al. | 188/158 |

FOREIGN PATENT DOCUMENTS

| | | |
|---|---|---|
| 0486281 | 5/1992 | European Pat. Off. . |
| 0630788 | 12/1994 | European Pat. Off. . |
| WO 9703869 | 2/1997 | European Pat. Off. . |
| 0924128 | 6/1999 | European Pat. Off. . |
| 195 10 522 | 9/1996 | Germany . |
| 195 48 560 | 6/1997 | Germany . |
| 196 52 230 | 6/1998 | Germany . |
| 197 03 838 | 8/1998 | Germany . |
| 97/03869 | 2/1997 | WIPO . |

OTHER PUBLICATIONS

SAE Paper 980600, "Modeling and Control of an Electromechanical Disk Brake" pp. 177–189.

ATZ Automobiltechnische Zeitschrift 98(1996)6 "Advanced Brake System with Highest Flexibility" pp. 328–333.

Automotive Industries May 1995, pp. 62–64, "Stable as She Goes".

SAE Paper 93ME115, "Electric Brake System for Passenger Vehicles—Ready for Production" pp. 62–64.

Institution of Mechanical Engineer 950762, "Intelligent Braking for Current and Future Vehicles" pp. 349–356.

*Primary Examiner*—Douglas C. Butler
*Attorney, Agent, or Firm*—Kenyon & Kenyon

[57] ABSTRACT

A method of diagnosing an electrically operated brake for abnormality thereof in an automotive vehicle wherein a wheel is braked by a friction force generated by an electric motor of the brake upon an operation of a brake operating member, the method comprising the steps of: applying an abnormality checking drive signal to the electric motor to operate the electric motor while the brake operating member is placed in a non-operated position; detecting a quantity relating to an output of the electric motor while the drive signal is applied to the electric motor; and determining that the electrically operated brake is abnormal, if the detected quantity does not normally correspond to a magnitude of the abnormality checking drive signal.

19 Claims, 17 Drawing Sheets

ROTATING DIRECTION OF DRUM

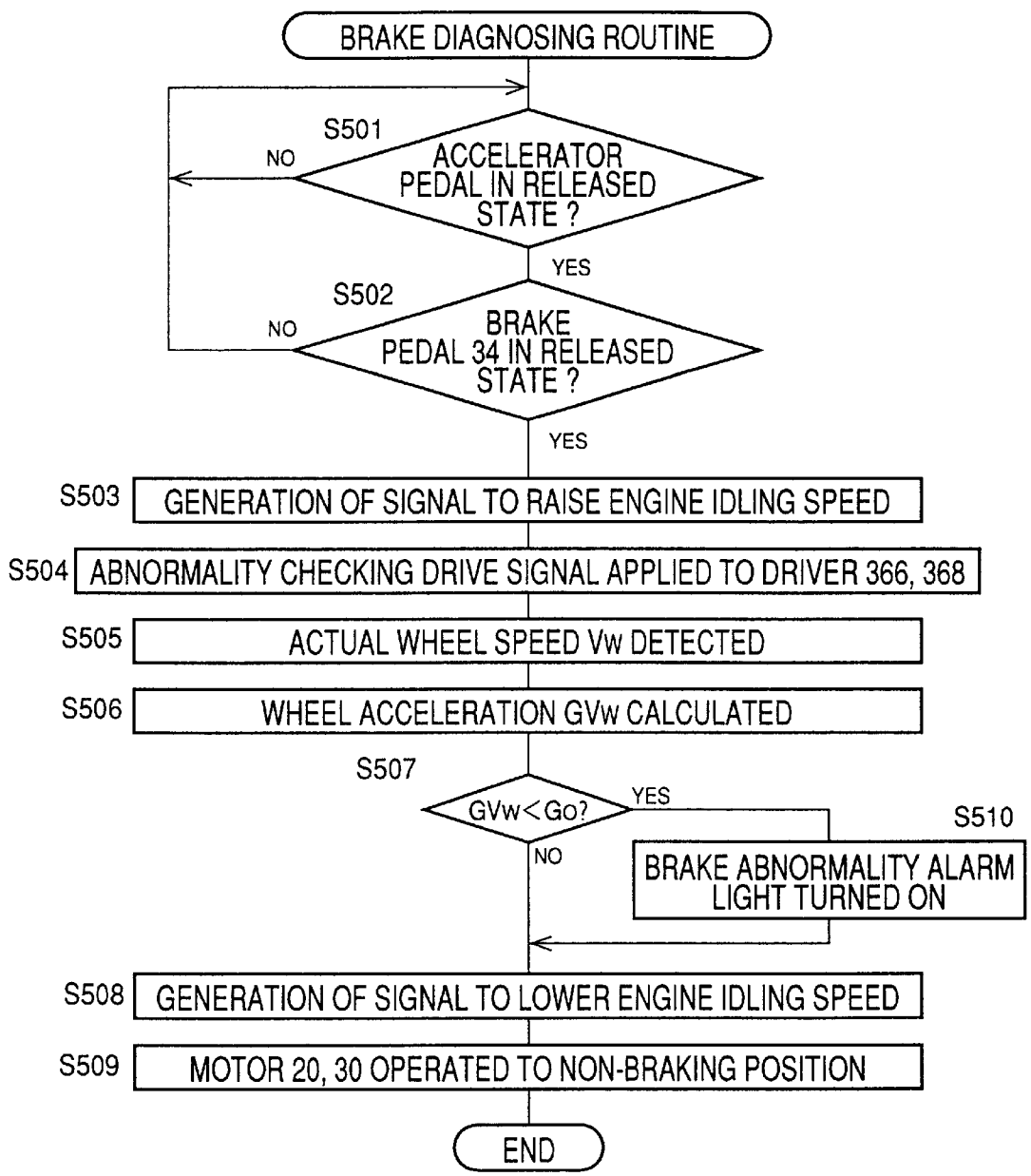

METHOD AND APPARATUS FOR DIAGNOSING ELECTRICALLY OPERATED BRAKE WITHOUT MANUAL OPERATION OF BRAKE OPERATING MEMBER

This application is based on Japanese Patent Application No. 9-346629 filed on Dec. 16, 1997, the content of which is incorporated hereinto by reference.

BACKGROUND OF THE INVENTION

1. Field of the Invention

The present invention relates to a technique for diagnosing an electrically operated brake for an automotive vehicle, for any abnormality or defect.

2. Discussion of the Related Art

Published International Application WO97/3869 discloses a method of diagnosing an electrically operated brake which includes an electric motor as a drive source. According to this method, a quantity relating to the output of the electric motor is detected upon operation of the brake, and the electrically operated brake is determined to be abnormal or defective if the detected quantity does not accurately correspond to the magnitude of a drive signal applied to the electric motor.

However, this conventional diagnosing method permits a diagnosis of the electrically operated brake only when the the brake is operated during running of the vehicle. In other words, the conventional method does not permit a diagnosis of the electrically operated brake before running of the vehicle.

When the vehicle is started while it is parked with both a normal brake and a parking brake being applied thereto, it is a common practice to first release the parking brake and then release the normal brake. In this case, there is a time period during which only the normal brake is in operation with the parking brake already placed in the released state. This operation of the normal brake is not for braking the running vehicle. It is desirable to diagnose the electrically operated brake for abnormality, without operation of the brake to brake the running vehicle.

SUMMARY OF THE INVENTION

It is therefore an object of the present invention to provide a method of diagnosing an electrically operated brake for abnormality, without or before operation of the brake to brake the running vehicle.

The above object may be achieved according to any one of the following modes of this invention, each of which is numbered and refers to the other mode or modes, where appropriate, like the claims, to indicate possible combinations of elements or features of the present invention.

(1) A method of diagnosing an electrically operated brake for abnormality thereof in an automotive vehicle wherein the brake includes an electric motor as a drive source for generating a friction force upon an operation of a manually operated brake operating member, to brake a wheel of the vehicle, the method comprising the steps of: applying an abnormality checking drive signal to the electric motor to operate the electric motor while the manually operated brake operating member is placed in a non-operated position; detecting a quantity relating to an output of the electric motor while the abnormality checking drive signal is applied to the electric motor; and determining that the electrically operated brake is abnormal, if the detected quantity does not normally correspond to a magnitude of the abnormality checking drive signal.

The brake diagnosing method of the present invention described above permits a diagnosis of the electrically operated brake for abnormality, without an operation of the brake operating member by the vehicle operator, that is, even before first application of an actual brake to the running vehicle.

The term "quantity relating to an output of the electric motor" may be selected from among suitable parameters such as: a drive force or torque of the electric motor; an amount of operation (force, torque, amount of displacement) of a movable member which is moved by an operation of the electric motor; a braking force or torque applied by the operated brake to the vehicle wheel; and a deceleration value of the automotive vehicle generated by the operated brake.

(2) A method according to the above mode (1), wherein the magnitude of the abnormality checking drive signal is determined such that the electrically operated brake does not apply a braking torque to the wheel.

According to this method, the diagnosis of the brake does not give the vehicle operator a discomfort or an unexpected change of the vehicle running condition.

(3) A method according to the above mode (1), wherein the magnitude of the abnormality checking drive signal is determined such that the electrically operated brake applies a braking torque to the wheel.

(4) A method according to the above mode (1), wherein the abnormality checking drive signal is applied to the electric motor so as not to cause a substantial change in a running condition of the automotive vehicle.

Where a braking torque is applied to the wheel during the diagnosis of the electrically operated brake, the vehicle may be decelerated unexpectedly to the vehicle operator. In the brake diagnosing method according to the above mode (4), the abnormality checking drive signal is applied to the electric motor without an operation of the brake operating member, so as not to cause a substantial change in the running condition of the vehicle, so that the brake can be diagnosed without giving a discomfort to the vehicle operator.

(5) A method according to any one of the above modes (1)–(4), wherein the electrically operated brake is provided for each of a front wheel and a rear wheel of the automotive vehicle, and the abnormality drive signal is applied to the electrically operated brakes for the front and rear wheels, at different times.

In the method according to the above mode (5) wherein applications of the abnormality checking drive signal to the electrically operated brakes for the front and rear wheels are effected at different times, the value of the deceleration of the vehicle if caused by the braking torque applied to each of the front and rear wheels by the appropriate brake is comparatively small, so that the vehicle operator is less likely to feel brake application to the vehicle during the diagnosis of each brake.

(6) A method according to any one of the above modes (1)–(5), wherein the automotive vehicle has a drive power source, and a manually operated vehicle accelerating member for increasing an output of the drive power source to thereby accelerate the automotive vehicle, the drive power source applying a drive-source-dependent braking torque to the wheel to thereby decelerate the automotive vehicle when the manually operated vehicle accelerating member is operated to a non-operated position thereof, the method further comprising a step of controlling the drive power source when the manually operated vehicle accelerating member is operated to the non-operated position while the manually operated brake operating member is placed in the non-operated position, so that an actual value of the drive-source-dependent braking torque is reduced to be smaller than a nominal value while the manually operated vehicle accelerating member is placed in the non-operated position, and wherein the step of applying an abnormality checking drive signal to the electric motor comprises determining the magnitude of the the abnormality checking drive signal such that a braking torque generated by the electrically operated brake with the drive signal applied thereto is substantially equal to an amount of reduction of the drive-source-dependent braking torque, and the step of detecting a quantity relating to an output of the electric motor comprises detecting a value of deceleration of the automotive vehicle while the drive signal is applied to the electric motor and while the vehicle accelerating member is placed in the non-operated position, the step of determining that the electrically operated brake is abnormal comprising determining that the electrically operated brake is abnormal, if the detected value of deceleration is smaller than a predetermined threshold value.

According to this method, the total braking torque consisting of the drive-source-dependent braking torque generated by the drive power source and the braking torque generated by the electrically operated brake during the diagnosis remains unchanged if the electrically operated brake is normally functioning. Therefore, this diagnosing method permits the diagnosis of the brake without giving a discomfort to the vehicle operator.

The term "drive power source" may be an engine (internal combustion engine) and/or an electric vehicle drive motor (which is different from the electric motor of the electrically operated brake).

(7) A method according to any one of the above modes (1)–(5), wherein the automotive vehicle has an engine, and a manually operated vehicle accelerating member for increasing an output of the engine to thereby accelerate the automotive vehicle, the engine applying an engine braking torque to the wheel to thereby decelerate the automotive vehicle when the manually operated vehicle accelerating member is operated to a non-operated position thereof, the method further comprising a step of controlling the engine when the manually operated vehicle accelerating member is operated to the non-operated position while the manually operated brake operating member is placed in the non-operated position, so that an actual value of the engine braking torque is reduced to be smaller than a nominal value while the manually operated vehicle accelerating member is placed in the non-operated position, and wherein the step of applying an abnormality checking drive signal to the electric motor comprises determining the magnitude of the the abnormality checking drive signal such that a braking torque generated by the electrically operated brake with the drive signal applied thereto is substantially equal to an amount of reduction of the engine braking torque, and the step of detecting a quantity relating to an output of the electric motor comprises detecting a value of deceleration of the automotive vehicle while the drive signal is applied to the electric motor and while the vehicle accelerating member is placed in the non-operated position, said step of determining that the electrically operated brake is abnormal comprising determining that the electrically operated brake is abnormal, if the detected value of deceleration is smaller than a predetermined threshold value.

In the method according to the above mode (7), the actual value of the engine braking torque while the vehicle accelerating member is in the non-operated position can be reduced to be smaller than the nominal value, by increasing the output of the engine. The engine output can be increased by increasing the rotating speed of the engine.

In the method of the above mode (7), the engine and the engine braking torque are examples of the "drive power source" and the "drive-source-dependent braking torque" in the above mode (6).

(8) A method according to any one of the above modes (1)–(7), wherein the manually operated brake operating member is used as a normal brake operating member for activating the electrically operated brake as a normal brake, the automotive vehicle further including a mechanically operated auxiliary brake, and a manually operated auxiliary brake operating member for activating the auxiliary brake, and wherein the step of determining that the electrically operated brake is abnormal if the detected quantity does not normally correspond to a magnitude of the abnormality checking drive signal is inhibited when the mechanically operated auxiliary brake is activated.

Where the brake operating member is used as not only the normal brake operating member but also the auxiliary brake operating member, not only the normal brake but also the auxiliary brake are not activated while the brake operating member is placed in the non-operated position. Where the normal brake operating member and the auxiliary brake operating member are both provided, the auxiliary brake may be activated even while the normal brake operating member is placed in the non-operated position. The relationship between the input (magnitude of the abnormality checking drive signal) and the output of the electric motor when the auxiliary brake is activated differs from that when the auxiliary brake is not activated. Accordingly, if the diagnosis of the electrically operated normal brake while the normal brake is not activated was effected while the auxiliary brake is activated, the accuracy of the diagnosis would be deteriorated. In view of this drawback, the present method is adapted to inhibit the diagnosis of the electrically operated normal brake while the mechanically operated auxiliary brake is activated with the auxiliary brake operating member being operated. Thus, the present method is effective to prevent erroneous determination as to whether the electrically operated normal brake is abnormal or not.

(9) A method of diagnosing an electrically operated brake for abnormality thereof in an automotive vehicle having a drive power source, a manually operated vehicle accelerating member for increasing an output of the drive power source for accelerating the automotive vehicle, a manually operated normal brake operating member for operating an electric motor of the electrically operated brake to generate a friction force for braking a wheel of the automotive vehicle, a parking brake, and a manually operated parking brake operating member for activating the parking brake to apply a parking brake to the wheel, and wherein a creep torque is applied from the drive power source to the wheel for slowly starting the automotive vehicle while the vehicle accelerating member is placed in a non-operated position thereof, the method comprising the steps of: applying an abnormality checking drive signal to the electric motor of the electrically operated brake when the automotive vehicle is at a stop with the automotive vehicle being braked by the electrically operated brake and the parking brake while the creep torque is applied to the wheel, the driving signal having a magnitude which is determined regardless of an amount of operation of the normal brake operating member such that a braking force generated by the electrically operated brake is larger than the creep torque; and determining that the electrically operated brake is abnormal, if the automotive vehicle is started when the parking brake operating member has been operated to a non-operated position thereof while the normal brake operating member is held in an operated position thereof.

In the brake diagnosing method according to the above mode (9) of the present invention described above, the diagnosis of the electrically operated brake is effected depending upon whether the vehicle is started by the creep torque, against the braking force generated by the electrically operated brake, when the parking brake operating member is released while the electrically operated brake is held in its operated state with the normal brake operating member kept in its operated position. Thus, the present method permits the diagnosis of the electrically operated brake for abnormality thereof before an operation of the normal brake operating member is operated to brake the running vehicle.

The term "drive power source" may be an engine (internal combustion engine) or an electric motor (different from the electric motor of the electrically operated brake).

(10) A method according to the above mode (9), wherein the step of determining that the electrically operated brake is abnormal is inhibited while the manually operated vehicle accelerating member is placed in an operated position thereof.

The diagnosing method according to the above mode (10) prevents erroneous determination due to an operation of the vehicle accelerating member during the diagnosis.

(11) A method according to the above mode (9), further comprising the steps of: applying another abnormality checking drive signal to said electric motor of said electrically operated brake while said manually operated normal brake operating member is placed in a non-operated position thereof; detecting a quantity relating to an output of said electric motor while said another abnormality checking drive signal is applied to said electric motor; and determining that said electrically operated brake is abnormal, if the detected quantity does not normally correspond to a magnitude of said another abnormality checking signal.

The diagnosing method according to the above mode (11) permits the diagnosis of the electrically operated brake not only when the parking brake operating member is in the non-operated position while the normal brake operating member is in the operated position, but also when the parking brake operating member and the normal brake operating member are both placed in the non-operated position.

(12) A method according to the above mode (11), wherein the steps of applying, detecting and determining recited with respect to the above mode (11) are effected only if the electrically operated brake is determined to be abnormal in the step of determining recited with respect to the above mode (9).

(13) A braking system for an automotive vehicle comprising an electrically operated braking device including (a) a manually operated brake operating member, (b) a braking member having a rotor rotating with a wheel of the vehicle and a friction member which is forced onto the rotor to brake the wheel, (c) an electric motor, (d) a drive force transmitting device for transmitting a drive force of the electric motor to the friction member, (e) an operation amount sensor for detecting an amount of operation of the brake operating member, and (f) a motor controller for controlling the electric motor on the basis of an output of the operation amount sensor, the braking system further comprising: a diagnosing device for applying an abnormality checking drive signal to the electric motor to operate the electric motor while the manually operated brake operating member is placed in a non-operated position, detecting a quantity relating to an output of the electric motor while the abnormality checking drive signal is applied to the electric motor, and determining that the electrically operated braking device is abnormal, if the detected quantity does not normally correspond to a magnitude of the abnormality checking drive signal.

In the braking system of the present invention described above, the diagnosing device permits a diagnosis of the electrically operated brake for abnormality, without an operation of the brake operating member by the vehicle operator, that is, even before first application of an actual brake to the running vehicle.

The term "quantity relating to an output of the electric motor" is interpreted to mean a parameter as described above with respect to the method according to the mode (1) of this invention.

The term "an operation amount of the brake operating member" may be an operating force acting on the brake operating member or an amount of operation or displacement of the brake operating member.

(14) A braking system according to the above mode (13), wherein the magnitude of the abnormality checking drive signal is determined so as to prevent a substantial change in a running condition of the automotive vehicle.

In the braking system according to the above mode (14), the abnormality checking drive signal is applied to the electric motor without an operation of the brake operating member, so as not to cause a substantial change in the running condition of the vehicle, so that the brake can be diagnosed without giving a discomfort to the vehicle operator.

(15) A braking system according to the above mode (13) or (14), wherein the electrically operated braking device is provided for each of a front wheel and a rear wheel of the automotive vehicle, and the diagnosing device applies the abnormality checking drive signal to the electrically operated braking devices for the front and rear wheels, at different times.

In the braking system according to the above mode (15) wherein applications of the abnormality checking drive signal to the electrically operated braking devices for the front and rear wheels are effected at different times, the value of the deceleration of the vehicle if caused by the braking torque applied to each of the front and rear wheels by the appropriate braking device is comparatively small, so that the vehicle operator is less likely to feel brake application to the vehicle during the diagnosis of each electrically operated braking device.

(16) A braking system according to any one of the above modes (13)–(15), wherein the automotive vehicle has a drive power source, and a manually operated vehicle accelerating member for increasing an output of the drive power source to thereby accelerate the automotive vehicle, the drive power source applying a drive-source-dependent braking torque to the wheel to thereby decelerate the automotive vehicle when the manually operated vehicle accelerating member is operated to a non-operated position thereof, and wherein the diagnosing device controls the drive power source when the manually operated vehicle accelerating member is operated to the non-operated position while the manually operated brake operating member is placed in the non-operated position, so that an actual value of the drive-source-dependent braking torque is reduced to be smaller than a nominal value while the manually operated vehicle accelerating member is placed in the non-operated position, the diagnosing device determines the magnitude of the abnormality checking drive signal such that a braking torque generated by the electrically operated brake with the drive signal applied thereto is substantially equal to an amount of reduction of the drive-source-dependent braking torque, the diagnosing device detecting a value of deceleration of the automotive vehicle while the drive signal is applied to the electric motor and while the vehicle accelerating member is placed in the non-operated position, and determining that the electrically operated brake is abnormal, if the detected value of deceleration is smaller than a predetermined threshold value.

According to this braking system, the total braking torque consisting of the drive-source-dependent braking torque generated by the drive power source and the braking torque generated by the electrically operated braking device during the diagnosis remains unchanged if the electrically operated braking device is normally functioning. Therefore, the diagnosing device permits the diagnosis of the braking device without giving a discomfort to the vehicle operator.

The term "drive power source" is interpreted to means an engine (internal combustion engine) and/or an electric vehicle drive motor (which is different from the electric motor of the electrically operated brake), as described above with respect to the above mode (6).

(17) A braking system according to any one of the above modes (13)–(15), wherein the automotive vehicle has an engine, and a manually operated vehicle accelerating member for increasing an output of the engine to thereby accelerate the automotive vehicle, the engine applying an engine braking torque to the wheel to thereby decelerate the automotive vehicle when the manually operated vehicle accelerating member is operated to a non-operated position thereof, and wherein the diagnosing device controls the engine when the manually operated vehicle accelerating member is operated to the non-operated position while the manually operated brake operating member is placed in the non-operated position, so that an actual value of the engine braking torque is reduced to be smaller than a nominal value while the manually operated vehicle accelerating member is placed in the non-operated position, the diagnosing device determining the magnitude of the the abnormality checking drive signal such that a braking torque generated by the electrically operated brake with the drive signal applied thereto is substantially equal to an amount of reduction of the engine braking torque, the diagnosing device detecting a value of deceleration of the automotive vehicle while the drive signal is applied to the electric motor and while the vehicle accelerating member is placed in the non-operated position, and determining that the electrically operated brake is abnormal, if the detected value of deceleration is smaller than a predetermined threshold value.

In the braking according to the above mode (17), the actual value of the engine braking torque while the vehicle accelerating member is in the non-operated position can be reduced to be smaller than the nominal value, by increasing the output of the engine. The engine output can be increased by increasing the rotating speed of the engine.

In the braking system of the above mode (17), the engine and the engine braking torque are examples of the "drive power source" and the "drive-source-dependent braking torque" in the above mode (16).

(18) A braking system according to any one of the above modes (13)–(17), wherein the manually operated brake operating member is used as a normal brake operating member for activating the electrically operated braking device as a normal braking device, the braking system further including a mechanically operated auxiliary braking device, and a manually operated auxiliary brake operating member for activating the auxiliary braking device, and wherein the diagnosing device inhibits a determination as to whether the electrically operated braking device is abnormal, when the mechanically operated auxiliary braking device is activated.

In the braking system according to the above mode (18) wherein the electrically operated braking device and the mechanically operated braking device are provided as the normal braking device and the auxiliary braking device, respectively, the determination as to whether the electrically operated braking device is abnormal is inhibited when the mechanically operated auxiliary braking device is activated.

(19) A braking system for an automotive vehicle, comprising a drive power source, a manually operated vehicle accelerating member for increasing an output of the drive power source for accelerating the automotive vehicle, an electrically operated brake, a manually operated normal brake operating member for operating an electric motor of the electrically operated brake to generate a friction force for braking a wheel of the automotive vehicle, a parking brake, and a manually operated parking brake operating member for activating the parking brake to apply a parking brake to the wheel, the automotive vehicle being arranged such that a creep torque is applied from the drive power source to the wheel for slowly starting the automotive vehicle while the vehicle accelerating member is placed in a non-operated position thereof, the braking system further comprising: a diagnosing device for applying an abnormality checking drive signal to the electric motor of the electrically operated brake when the automotive vehicle is at a stop with the automotive vehicle being braked by the electrically operated brake and the parking brake while the creep torque is applied to the wheel, the driving signal having a magnitude which is determined regardless of an amount of operation of the normal brake operating member such that a braking force generated by the electrically operated brake is larger than the creep torque, the diagnosing device determining that the electrically operated brake is abnormal, if the automotive vehicle is started when the parking brake operating member has been operated to a non-operated position thereof while the normal brake operating member is held in an operated position thereof.

In the braking system according to the above mode (19) of the present invention described above, the diagnosis of the electrically operated brake is effected by the diagnosing device, depending upon whether the vehicle is started by the creep torque, against the braking force generated by the electrically operated brake, when the parking brake operating member is released while the electrically operated brake is held in its operated state with the normal brake operating member kept in its operated position. Thus, the diagnosing device permits the diagnosis of the electrically operated brake for abnormality thereof before an operation of the normal brake operating member is operated to brake the running vehicle.

The term "drive power source" may be an engine (internal combustion engine) or an electric motor (different from the electric motor of the electrically operated brake).

BRIEF DESCRIPTION OF THE DRAWINGS

The above and optional objects, features, advantages and industrial and technical significance of this invention will be better understood by reading the following detailed description of presently preferred embodiments of the invention, when considered in connection with the accompanying drawings, in which:

FIG. 17 is a flow chart illustrating a brake diagnosing routine stored in a ROM of a computer of an electronic control unit provided in a braking system adapted to practice a diagnosing method according to a fifth embodiment of this invention.

DETAILED DESCRIPTION OF THE PREFERRED EMBODIMENTS

Figure 1:
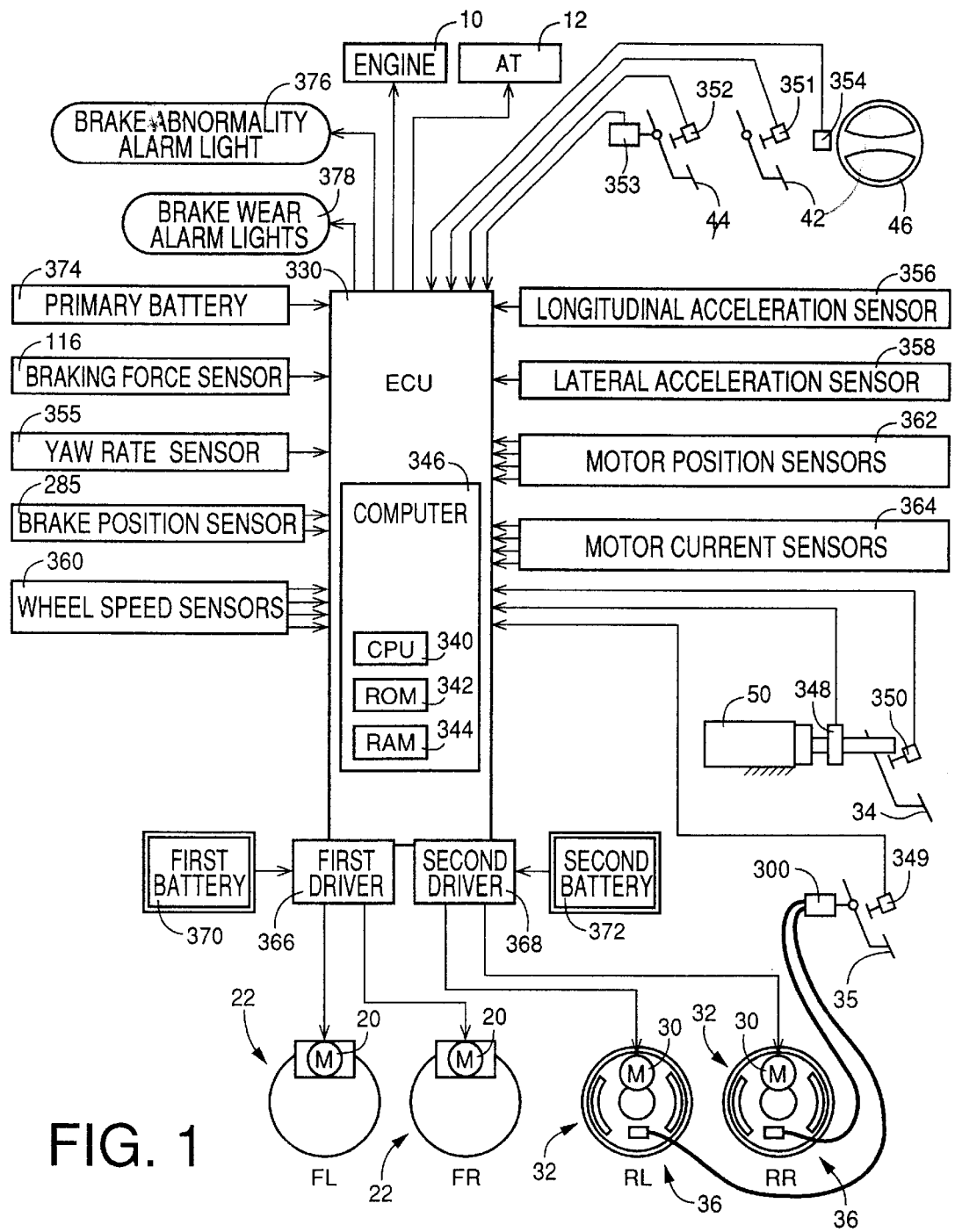
FIG. 1 is a schematic view showing a vehicle braking system adapted to practice a diagnosing method according to one embodiment of this invention.

Referring first to FIG. 1, there is shown a general arrangement of the braking system according to the first embodiment of this invention. This braking system is adapted for use on a four-wheel automotive vehicle having a front left wheel FL, a front right wheel FR, a rear left wheel RL and a rear right wheel RR. The vehicle includes a drive power source in the form of an internal combustion engine 10, and a power transmitting device in the form of an automatic transmission 12. The engine 10 and the automatic transmission 12 cooperate to rotate the selected drive wheels to drive the vehicle. The front wheels FL, FR or the rear wheels RL, RR, or both of the front and rear wheels FL, FR, RL, RR are used as the drive wheels.

Each of the front left and right wheels FL, FR is provided with an electrically operated disc brake 22 which uses an ultrasonic motor 20 as a drive source and which does not use any working fluid for brake application. The disc brake 22 is operated in response to an operation of a brake pedal 34. On the other hand, each of the rear left and right wheels RL, RR is provided with an electrically operated drum brake 32 serving as a normal brake and a mechanically operated drum brake 36 serving as an emergency brake or auxiliary brake. The electrically operated drum brake 32 uses a DC motor 30 as a drive source and does not use any working fluid. The drum brake 32 is operated in response to the operation of the brake pedal 34. The mechanically operated drum brake 36 is operated in response to an operation of an emergency brake pedal 35, which serves as a drive source for the drum brake 36. This drum brake 36 does not use any working fluid, either. The brake pedal 34 is provided as a normal brake operating member, while the emergency brake pedal 35 is provided an an auxiliary brake operating member. As described later, the electrically operated drum brake 32 and the mechanically operated drum brake 36 use the same friction members in the form of brake linings, and the same drum.

The automotive vehicle is provided with various manually operated members including: the above-indicated brake pedal 34 and emergency brake pedal 35; an auxiliary brake operating member in the form of a parking brake pedal 42; a vehicle accelerating member in the form of an accelerator pedal 44; and a steering wheel 46.

When the parking brake pedal 42 is operated, the electrically operated disc brakes 22 for the front left and right wheels FL, FR are activated to apply a parking brake to the vehicle. Each electrically operated disc brake 22 generates a braking torque for braking the corresponding front wheel, based on a holding torque of the ultrasonic motor 20. When the accelerator pedal 44 is operated, the drive force produced by the engine 10 is increased to accelerate the vehicle. When the steering wheel 46 is rotated, the front wheels FL, FR are steered through a suitable steering device. The rear wheels RL, RR may also be used as the steering wheels.

The brake pedal 34 is linked with a stroke rendering mechanism 50, which enables the brake pedal 34 to be depressed by an amount corresponding to the operating force acting thereon.

Figure 2:
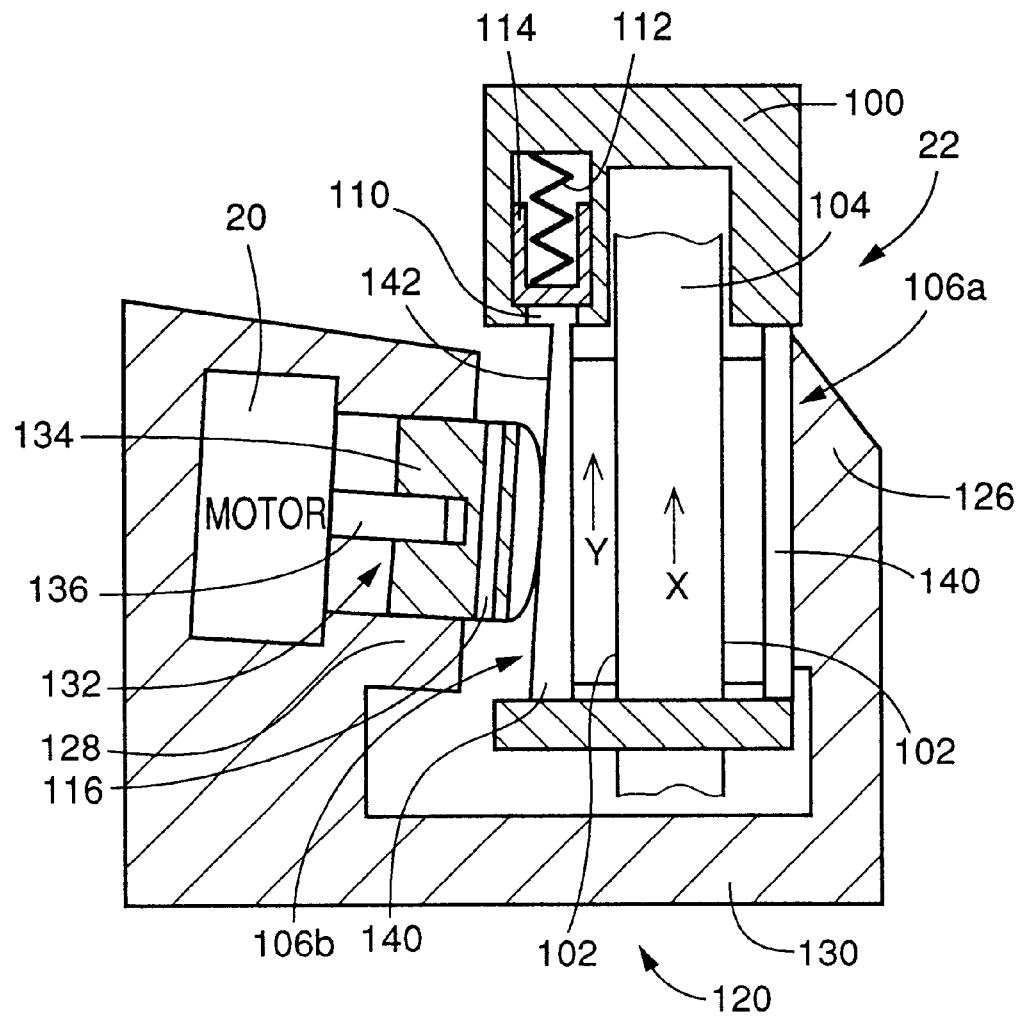
FIG. 2 is a plan view in cross section showing an electrically operated disc brake for each front wheel of the vehicle.

Referring next to FIG. 2, the electrically operated disc brake 22 provided for each of the front wheels FL, FR will be described in detail. In FIG. 2, the disc brake 22 for the front right wheel FR is shown by way of example.

The electrically operated disc brake 22 includes a stationary member in the form of a mounting bracket 100 attached to the vehicle body, and a disc rotor 104 which has opposite friction surfaces 102 and which rotates with the front right wheel FR. The mounting bracket 100 supports a pair of brake pads 106a, 106b on the opposite sides of the disc rotor 104 such that the brake pads 106a, 106b are movable in the axial direction of the disc rotor 104. The mounting bracket 100 includes a torque receiving portion which receives friction forces generated between the brake pads 106a, 106b and the disc rotor 104 upon frictional contact therebetween. In FIG. 2, arrow X indicates the direction of rotation of the disc rotor 104 for running the vehicle in the forward direction.

One of the two brake pads 106a, 106b which is located on the outer side of the disc rotor 104 as viewed in the lateral direction of the vehicle is referred to as "an outer pad 106a". This outer pad 106a is supported by the mounting bracket such that a rotating movement of the outer pad 106a with the disc rotor 104 during their frictional contact is substantially inhibited. On the other hand, the inner pad 106b located on the inner side of the disc rotor 104 is supported by the mounting bracket 100, so as to positively permit a rotating movement of the outer pad 106b with the disc rotor 104 during their frictional contact. Arrow Y in FIG. 2 indicates a so-called "dragging direction" in which the outer pad 106b is moved (rotated) with the disc rotor 104 during their frictional contact.

The movement of the inner pad 106b with the disc rotor 104 is not always permitted. Namely, this movement is inhibited while a frictional force generated between the disc rotor 104 and the inner pad 106b is smaller than a predetermined first threshold value. When this friction force has reached the first threshold value, the movement of the inner pad 106b with the disc rotor 104 is permitted. To inhibit and permit the movement of the inner pads 106b with the disc rotor 104 during their frictional contact, the front end portion of the inner pad 106b engages the mounting bracket 100 through an elastic member in the form of a spring 112. While the friction force between the inner pad 106b and the disc rotor 104 is smaller than the first threshold value, the spring 112 is not elastically deformed or compressed, thereby inhibiting the movement of the inner pad 106 with the disc rotor 104. When the friction force has increased to the first threshold, the spring 112 is compressed, permitting the inner pad 106b to be moved with the disc rotor 104 in the dragging direction Y. In the present embodiment, the inner pad 106b is provided with a stop 114 which is brought into abutting contact with a surface of the mounting bracket 100 when the friction force between the inner pad 106b and the disc rotor 10r has increased a predetermined second threshold value. Thus, the amount of the movement of the inner pad 106b with the disc rotor 104 is limited, in order to avoid an excessive increase of a self-servo effect which is provided y the disc brake 22 as described below.

The electrically operated disc brake 22 incorporates a braking force sensor 116 for detecting a quantity relating to the front wheel braking force. In the present embodiment, the braking force sensor 116 is attached to a presser member 134 (which will be described) such that the sensor 116 receives a force acting thereon in the axial direction of the ultrasonic motor 20, in order to detect the force by which the inner pad 106b is pressed by the presser member 134 onto the disc rotor 104. This force is detected as the quantity relating to the braking force applied to the corresponding front wheel.

The electrically operated disc brake 22 further includes a caliper body 120 which is movable in the axial direction of the disc rotor 104 and is not rotatable about the axis of the disc rotor 104. The caliper body 104 is attached to the vehicle body, such that the caliper body 104 is slidable on a plurality of slide pins which extend in the axial direction of the disc rotor 104. The caliper body 104 extends over the periphery of the disc rotor 104, and includes (a) a reaction portion 126 located adjacent to the outer pad 106a, (b) a pressing portion 128 located adjacent to the inner pad 106b, and (c) a connecting portion 130 connecting the reaction and pressing portion 126, 128.

The pressing portion 128 accommodates the ultrasonic motor 20 which has a rotary output shaft 136 connected coaxially with the presser member 134 through a motion converting mechanism in the form of a ballscrew mechanism 132. The presser member 134 is supported by the pressing portion 128 such that the presser member 134 is movable in the axial direction of the rotary shaft 136 and is not rotatable about the axis of the rotary shaft 136. A rotary motion of the rotary shaft 136 of the ultrasonic motor 20 is converted by the ballscrew mechanism 132 into a linear motion of the presser member 134. In this arrangement, bidirectional operations of the ultrasonic motor 20 cause the presser member 134 to be moved toward and away from the disc rotor 104. With the presser member 134 moved toward the disc rotor 104, the inner pad 106b and the outer pad 106a are forced onto the opposite friction surfaces 102 of the disc rotor 104.

The outer pad 106a has a backing plate 140 whose thickness is constant in the rotating direction X of the disc rotor 104. On the other hand, the inner pad 106b has a backing plate 140 whose thickness continuously decreases in the dragging direction Y (in the forward running direction of the vehicle). The packing plate 140 of the inner pad 106b has an inclined surface 142 which is inclined with respect to the friction surface 102 of the disc rotor 104. When the presser member 134 is advanced toward the disc rotor 104, the front end face of the presser member 134 is brought into contact with the inclined surface 142 of the inner pad 106b. When the inner pad 106b is moved with the disc rotor 104 during their frictional contact, there arises a relative sliding movement between the front end face of the presser member 134 and the inclined surface 142. In this arrangement, the inner pad 106b functions as a wedge between the disc rotor 104 and the presser member 134 upon movement of the inner pad 106b with the disc rotor 104, causing the disc brake 22 to provide a self-servo effect. In this embodiment, the centerline of the presser member 134 parallel to the axis of the rotary shaft 136 of the ultrasonic motor 20 is perpendicular to the inclined surface 142 of the inner pad 106b.

The operation of the electrically operated disc brake 22 will be described.

When the brake pedal 34 is depressed by the vehicle operator, the ultrasonic motor 20 is operated to advance the presser member 134 from its fully retracted or original position to its fully advanced position at which the brake pads 106a, 106b are forced onto the disc rotor 104, whereby the friction forces are generated between the brake pads 106a, 106b and the disc rotor 104.

While the friction force between the inner pad 106b and the disc rotor 104 is smaller than the predetermined first threshold value which is determined by a preset load of the spring 112, the spring 112 inhibits the movement of the inner pad 106b with the disc rotor 104, thereby inhibiting the disc brake 22 from exhibiting a self-servo effect. Thus, the front wheel is braked by the disc brake 22 without a self-servo effect immediately after the operation of the disc brake 22 is initiated, that is, while the friction force between the inner pad 106b and the disc rotor 104 is relatively small, with a relatively small operating force acting on the brake pedal 34.

When the friction force between the inner pad 106b and the disc rotor 104 has increased to the first threshold value corresponding to the preset load of the spring 112, the spring 112 permits the movement of the inner pad 106b with the disc rotor 104. As a result, the point of contact of the end face of the presser member 134 with the inclined surface 142 changes due to relative sliding movement therebetween, causing a tendency of an increase in the distance between the friction surface 102 of the disc rotor 104 and the inclined surface 142. Accordingly, the inner pad 106b is forced onto the disc rotor 104 by the presser member 134 by an increased force in the direction of thickness of the inner pad 106b. Thus, the inner pad 106b functions as a wedge between the disc rotor 104 and the presser member 134, causing the disc brake 22 to brake the front wheel with a self-servo effect, where the friction force between the inner pad 106b and the disc rotor 104 is relatively large due to a relatively large operating force acting on the brake pedal 34, for example, an operating force large enough to cause a deceleration value of the vehicle of about 0.3–0.6 G.

When the stop 114 of the inner pad 106b has been brought into abutting contact with the mounting bracket 100 as a result of a further increase of the friction force between the inner pad 106b and the disc rotor 104, a further movement of the inner pad 106b with the disc rotor 104 is inhibited, to prevent a further increase in the self-servo effect provided by the disc brake 22.

Although the front disc brakes 22 are adapted to brake the front wheels utilizing a self-servo effect, the front disc brakes may be arranged to brake the front wheels without utilizing a self-servo effect.

Figure 3:
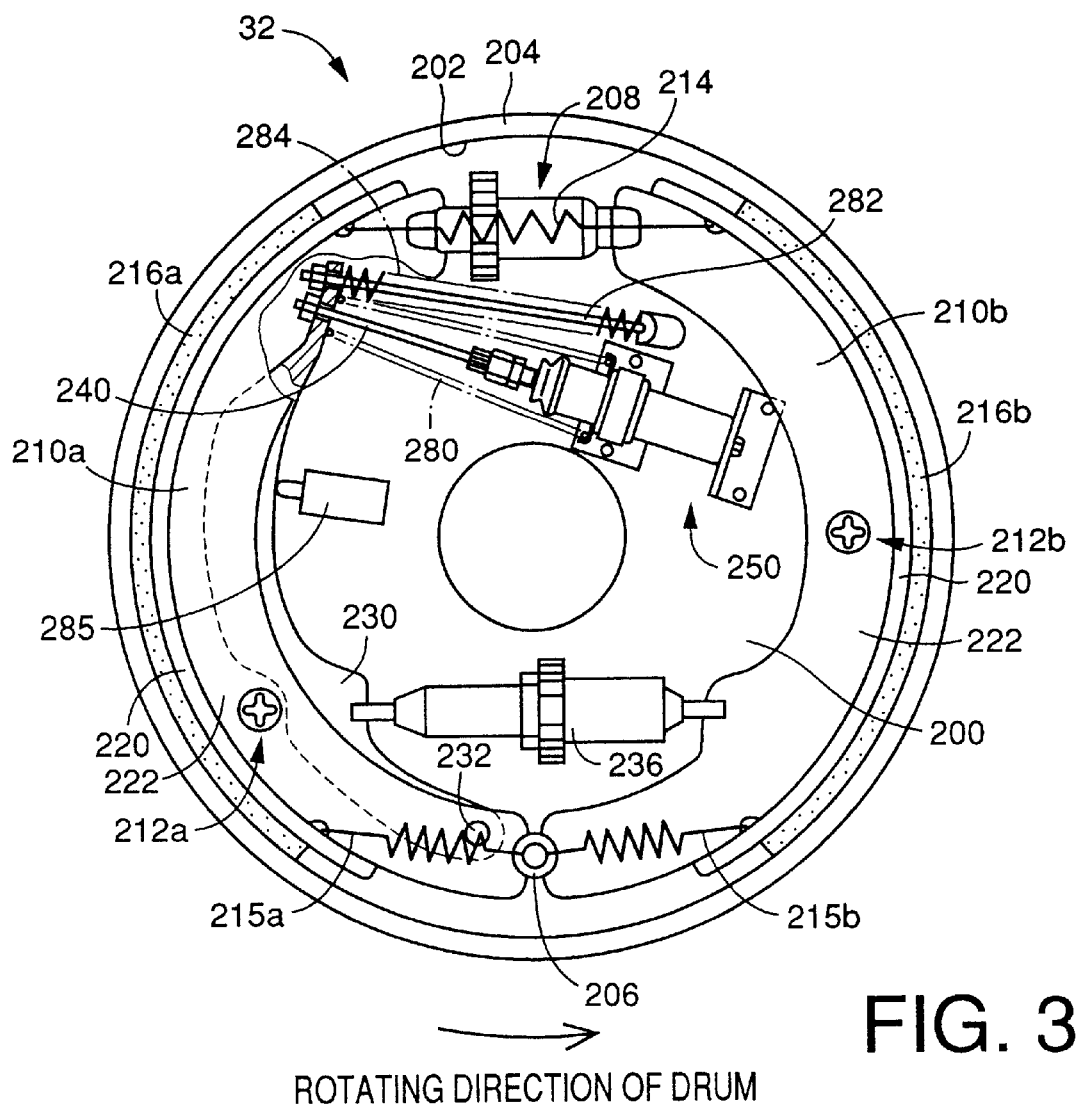
FIG. 3 is a side elevational view in cross section showing an electrically operated drum brake for each rear wheel.
Figure 4:
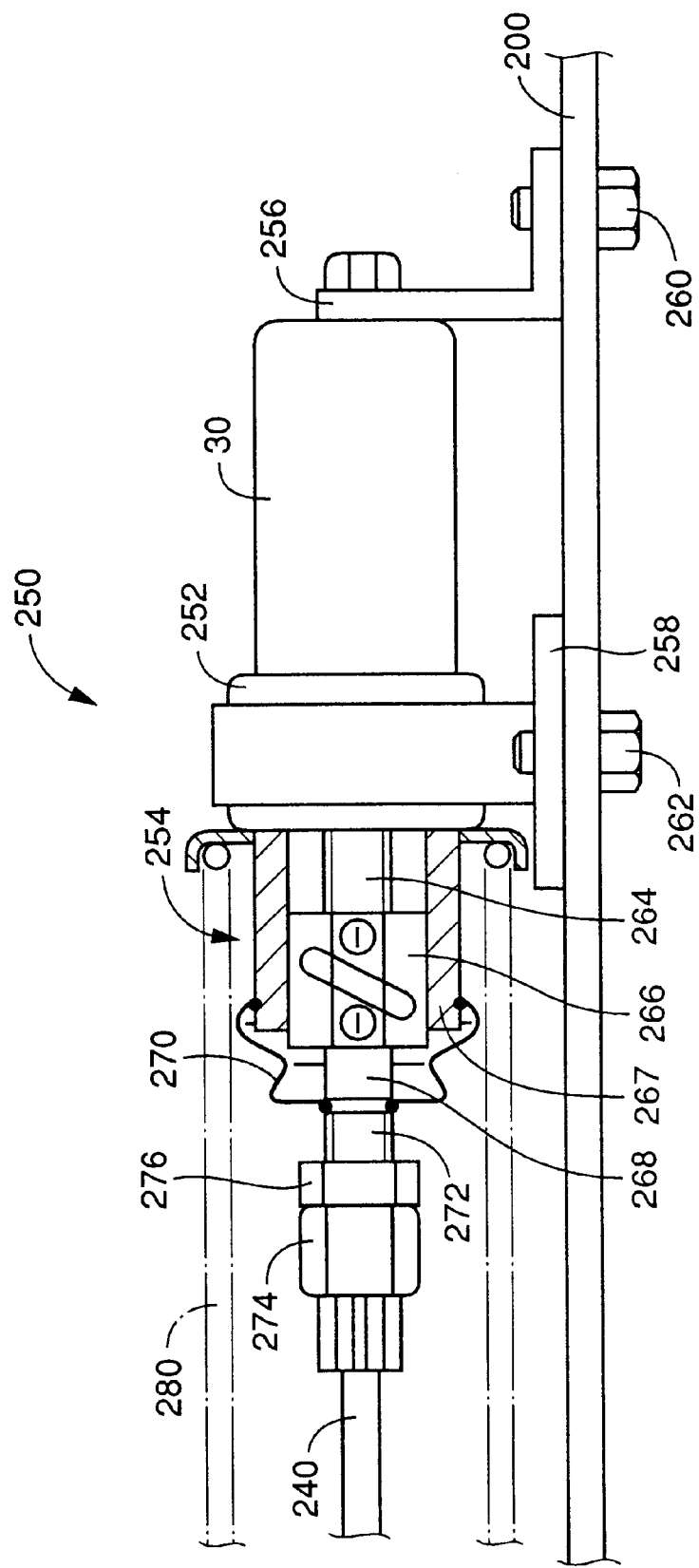
FIG. 4 is an enlarged side elevational view partly in cross section of a shoe expanding actuator provided in the rear wheel drum brake of FIG. 3.

Referring next to FIGS. 3 and 4, the electrically operated drum brake 32 provided for each of the rear left and right wheels RL, RR will be described. In FIG. 3, the electrically operated drum brake 32 for the rear right wheel RR is shown.

As shown in FIG. 3, the drum brake 32 includes a stationary member in the form of a substantially circular backing plate 200 fixed to the vehicle body, and a drum 204 which has an inner circumferential friction surface 202 and which rotates with the rear wheel RL, RR. The backing plate 200 has an anchor member in the form of an anchor pin 206 fixed to a relatively radially outer portion thereof at a given circumferential position thereof. At another circumferential position of the backing plate 200 which is diametrically opposite to the circumferential position at which the anchor pin 206 is fixed, there is disposed a connecting link in the form of an adjuster 208 of a floating type not directly fixed to the backing plate 200. A pair of friction members in the form of a pair of brake shoes 210a, 210b are disposed between and so as to connect the anchor pin 206 and the adjuster 208, such that the brake shoes 210a, 210b face the inner friction surface 202 of the drum 204. Each of the brake shoes 210a, 210b has an arcuate shape. The brake shoes 210a, 210b are fixed by respective hold-down devices 212a, 212b to the backing plate 200 such that the brake shoes 210a, 210b are movable in a plane parallel to the backing plate 200. The backing plate 200 has a central opening through which a rear axle shaft extends so as to be rotatable.

Each of the brake shoes 210a, 210b is operatively connected at one end thereof to the corresponding end portion of the adjuster 208, and is held at the other end in abutting contact with the anchor pin 206, so that the shoe 210a, 210b is pivotable about the anchor pin 206. An adjusting spring 214 is connected to the end portions of the brake shoes 210a, 210b operatively connected to the adjuster 208, so that the end portions are biased by the adjusting spring 214 toward each other. Return springs 215a, 215b are connected to the other end portions of the brake shoes 210a, 210b, respectively, so that these end portions are biased by the return springs 215a, 215b toward the anchor pin 206. The arcuate brake shoes 210a, 210b have respective arcuate brake linings 216a, 216b held at their outer surfaces such that the brake linings 216a, 216b face the inner circumferential friction surface 202 of the drum 204. With frictional contact of these brake linings 216a, 216b with the inner circumferential friction surface 202, there arise friction forces between the brake linings 216a, 216b and the drum 204. The adjuster 208 is manually operated to establish a suitable amount of gap between the brake linings 216a, 216b and the friction surface 202, before or during installation of the drum brake 32 on the vehicle, and is automatically operated to change the gap depending upon the amount of wear of the brake linings 216a, 216b during the service life of the drum brake 32.

Each brake shoe 210a, 210b consists of a rim 220 and a web 222. A lever 230 is pivotably connected at one end thereof to a lever support member in the form of a pin 232 fixed to the web 222 of the brake shoe 210a. The lever 230 and the web 222 of the other brake shoe 210b have respective cutouts which engage respective opposite ends of a strut 236 which serves as a power transmitting member. The strut 236 has a screw mechanism which can be manually operated to adjust the length of the strut 236. Thus, the gap between the brake shoes 210a, 210b and the friction surface 202 of the drum 204 can be adjusted before or during installation of the drum brake 32.

The present electrically operated drum brake 21 is activated by pivotal movement of the lever 230 about the pin 232 at its one end when the brake pedal 34 (FIG. 1) is operated. To this end, a normal brake cable 240 is connected to the other end of the lever 230, as shown in FIG. 3. The normal brake cable 240 consists of a strand of a plurality of wires, and is accordingly flexible. The normal brake cable 240 is connected to a shoe expanding actuator 250 attached to the backing plate 200. As shown in enlargement in FIG. 4, the shoe expanding actuator 250 includes the DC motor 30, a speed reducer 252 whose input shaft is connected to the output shaft of the DC motor 30, and a motion converting mechanism in the form of a ballscrew mechanism 254 whose input member is connected to an output shaft of the speed reducer 252. The end of the normal brake cable 240 remote from the lever 230 is connected to an output member of the ballscrew mechanism 254. A rotary motion of the DC motor 30 is converted by the ballscrew mechanism 254 into a linear movement of the normal brake cable 240. In FIG. 4, reference numerals 256 and 258 denote brackets, while reference numerals 260, 262 denote mounting screws for mounting the brackets 256, 258 to the backing plate 200.

The ballscrew mechanism 254 includes an externally threaded member 264 serving as the input member, a nut 266 serving as the output member, and a plurality of balls through which the externally threaded member 264 and the nut 266 engage each other. The nut 266 engages a stationary housing 267 such that the nut 266 is not rotatable and is axially movable relative to the housing 267. A rotary motion of the externally threaded member 264 is converted into a linear or axial motion of the nut 266. The nut 266 has an output shaft 268 fixed to its one end remote from the externally threaded member 264, such that the output shaft 268 is coaxial with the nut 266. The externally threaded member 264, nut 266 and output shaft 268 are protected against exposure of their engaging portions to dust or other foreign matters, by the housing 267 and an elastic dust boot 270.

The normal brake cable 240 is connected to the output shaft 268 through a cable fixing screw in the form of an externally threaded member 272 and a cable fixing nut 274. The externally threaded member 272 is formed so as to extend from the end of the output shaft 268 remote from the ballscrew mechanism 254, while the nut 274 engages the externally threaded member 272 and is connected to the normal brake cable 240. A lock nut 276 is screwed on the externally threaded member 272 such that the lock nut 276 is forced against the cable fixing nut 274, so as to lock the nut 274, namely, so as to prevent loosening of the nut 274.

The shoe expanding actuator 250 constructed as described above is operated in one direction to pull the normal brake cable 240 upon operation of the brake pedal 34, so that the lever 230 is pivoted about the pin 232 such that the end portion of the lever 230 to which the normal brake cable 240 is connected is moved toward the brake shoe 210b. As a result, the two brake shoes 210a, 210b are moved away from each other.

After the shoe expanding actuator 250 is operated in the reverse direction and returned to its initial non-operated or non-braking position, the brake shoes 210a, 210b are moved toward each other by a shoe contracting mechanism in the form of a normal brake return spring 280, against a self-servo effect. The normal brake return spring 280 is a compression coil spring which is connected at its one end to the lever 230 and at the other end to a stationary portion (e.g., housing or bracket) of the actuator 250. The compression coil spring 280 is disposed coaxially with the normal brake cable 240. Upon releasing of the brake pedal 34, the actuator 250 is returned to its initial position, and the lever 230 is pivoted to be returned to its initial non-operated position under the biasing force of the normal brake return spring 280.

The electrically operated drum brake 32 is provided with a brake position sensor 285 for detecting its operating position. The brake position sensor 285 has a probe held in contact with the lever 230, to detect the operating position (angular position) of the lever 230.

While the electrically operated drum brake 32 has been described, the mechanically operated drum brake 36 for each of the rear left and right wheels RL, RR will be described.

The mechanically operated drum brake 36 utilizes all elements of the electrically operated drum brake 32, except the normal brake cable 240, shoe expanding actuator 250 and normal brake return spring 280. The drum brake 36 includes an emergency brake cable 282 in place of the normal brake cable 240, and an emergency brake return spring 284 in place of the normal brake return spring 280. The emergency brake return spring 284 is disposed coaxially with the emergency brake cable 282. The normal brake cable 240 and the emergency brake cable 282 are both connected to the end portion of the lever 230 remote from the pin 232. The emergency brake cable 282 is connected to the emergency brake pedal 35. Upon operation of the emergency brake pedal 35, the lever 230 is pivoted to force the brake linings 216a, 216b onto the inner circumferential friction surface 202 of the drum 204, thereby braking the rear wheel RL, RR. Like the normal brake cable 240, the emergency brake cable 282 consists of a strand of a plurality of wires, and is flexible.

The two emergency brake cables 282 for the two mechanically operated drum brakes 36 for the two rear wheels RL, RR are connected to the emergency brake pedal 35 through an emergency brake control 300, which transmits the operating force acting on the emergency brake pedal 35, to the two emergency brake cables 282 as pulling forces acting on the lever 230.

In the braking system constructed as described above, an operation of the brake pedal 34 activates the shoe expanding actuator 250 to pull the normal brake cable 340, for thereby pivoting the lever 230 in a shoe-expanding direction for moving the two brake shoes 210a, 210b away from each other and toward the friction surface 202 of the drum 204. At this time, the emergency brake cable 282 which is flexible as described above become loose or slack, so that the braking movements of the brake shoes 210a, 210b by the electrically operated drum brakes 32 are not disturbed by the mechanically operated drum brakes 36.

When the emergency brake pedal 35 is operated, on the other hand, the emergency brake cable 282 of each drum brake 36 is pulled, so as to pivot the lever 230 in the shoe-expanding direction. Like the emergency brake cable 282, the normal brake cable 240 which is also flexible becomes loose or slack, so that the braking movements of the brake shoes 210a, 210b by the mechanically operated drum brakes 36 are not disturbed by the electrically operated drum brakes 32.

In the present embodiment wherein the normal and emergency brake cables 240, 280 are both connected to the lever 230 and are operated at different times, the operation of the operated cables 240, 280 is not disturbed by the non-operated cables 240, 280, owing to the flexible or elastic property of those brake cables 240, 282.

While the hardware arrangement of the present braking system has been described, a software arrangement of the braking system will be described.

As shown in FIG. 1, the present braking system includes an electronic control unit 330 (abbreviated as "ECU" in FIG. 1). The electronic control unit 330 is principally constituted by a computer 346 incorporating a central processing unit (CPU) 340, a read-only memory (ROM) 342 and a random-access memory (RAM) 344. The electronic control unit 330 receives output signals of various sensors and switches including: the above-indicated braking force sensors 116; the above-indicated brake position sensors 285; an operating force sensor 348; an emergency brake pedal switch 349; a brake pedal switch 350; a parking brake pedal switch 351; an accelerator pedal switch 352; an accelerator pedal operation amount sensor 353; a steering angle sensor 354; a yaw rate sensor 355; a longitudinal acceleration sensor 356; a lateral acceleration sensor 358; wheel speed sensors 360 for the four wheels FL, FR, RL, RR; motor position sensors 362 for the four wheels; and motor current sensors 364 for the four wheels.

The operating force sensor 348 generates an output signal indicative of the operating force F acting on the brake pedal 34. The emergency brake pedal switch 349 is an example of an emergency brake sensor adapted to generate a first or OFF signal when the emergency brake pedal 35 is in the non-operated position, and a second or ON signal when the emergency brake pedal 35 is in the operated position. The brake pedal switch 350 is an example of a normal brake sensor adapted to generate a first or OFF signal when the brake pedal 34 is in the non-operated position, and a second or ON signal when the brake pedal 34 is in the operated position. The parking brake pedal switch 351 is an example of a parking brake sensor adapted to generate a first or OFF signal when the parking brake pedal 42 is in the non-operated position, and a second or ON signal when the parking brake pedal 42 is in the operated position. The accelerator pedal switch 352 is an example of an accelerator operation sensor adapted to generate a first or OFF signal when the accelerator pedal 44 is in the non-operated position, and a second or ON signal when the accelerator pedal 44 is in the operated position. The accelerator pedal operation amount sensor 353 is an example of a vehicle acceleration sensor adapted to generate an output signal indicative of the amount of operation of the accelerator pedal 44. The steering angle sensor 354 is an example of a vehicle turn sensor adapted to generate an output signal indicative of the angular position of the steering wheel 46. The yaw rate sensor 355 is adapted to generate an output signal indicative of the yaw rate of the vehicle. The longitudinal acceleration sensor 356 is adapted to generate an output signal indicative of a deceleration value $G_{FR}$ of the vehicle in the longitudinal direction. The lateral acceleration sensor 358 is adapted to generate an output signal indicative of a deceleration value $G_{LR}$ of the vehicle in the lateral or transverse direction. Each of the four wheel speed sensors 360 is adapted to generate an output signal indicative of the rotating speed of the corresponding vehicle wheel. Each of the motor position sensors 362 is adapted to generate an output signal indicative of the angular position of the motor 20, 30 of the corresponding wheel. Each of the motor current sensors 364 is adapted to generate an output signal indicative of an amount of electric current applied to the coil winding of the motor 20, 30 of the corresponding wheel.

To the electronic control unit 330, there are connected a first driver 366 and a second driver 368. The first driver 366 is interconnected between an electric power source in the form of a first battery 370 and the ultrasonic motors 20 of the electrically operated disc brakes 22 of the front left and right wheels FL, FR. The second driver 368 is interconnected between an electric power source in the form of a second battery 372 and the DC motors 30 of the electrically operated drum brakes 32 of the rear left and right wheels RL, RR. When the brake pedal 34 is operated, the electronic control unit 330 commands the first and second drivers 366, 368 to apply controlled electric currents from the first and second batteries 370, 372 to the motors 20, 30.

The present braking system further has a primary battery 374 as an electric power source, which is provided independently of the first and second batteries 370, 372. This primary battery 374 is used for all electric components of the vehicle, except the motors 20, 30. Thus, the electronic control unit 330 is not powered by the first or second battery 370, 372, but is powered by the primary battery 374.

The electronic control unit 330, also connected to the engine output control devices (such as a throttle control device, a fuel supply control and an ignition timing control device) for controlling the engine 10, and a shift control device (including solenoid-operated shift control vales) for controlling shifting actions of the automatic transmission 12. During running of the vehicle, the electronic control unit 330 applies control signals to the engine output control devices and the shift control device, to control the drive forces for the drive wheels, for preventing a spinning tendency of each drive wheel. That is, the electronic control unit 330 is adapted to effect a traction control of the drive wheels, as well known in the art.

Also connected to the electronic control unit 330 are a brake abnormality alarm light 376 functioning as a brake abnormality indicator, and brake wear alarm lights 378 functioning as an excessive brake wear indicator. The brake abnormality light 376 is turned on to inform the vehicle operator of an occurrence of an electrical abnormality or defect of the electrically operated disc or drum brake 22, 32. The brake wear alarm lights 378 are provided for the four wheels FL, FR, RL, RR, respectively. Each of these alarm lights 378 is turned on when the estimated amount of wear of the friction members of the corresponding brake 22, 32 (36) has exceeded a predetermined threshold, so that the vehicle operator is informed of this fact. The brake abnormality alarm light 376, which provides a visible alarm, may be replaced by a buzzer or other indicator adapted to provide an audible alarm. Alternatively, the brake abnormality indicator consists of both of a visual indicator and an audio indicator.

The ROM 342 of the computer 346 stores various control programs including control programs for executing a normal brake control routine a parking brake control routine, a front disc brake diagnosing routine, a rear drum brake diagnosing routine, a front disc brake wear monitoring routine and a rear drum brake wear monitoring routine.

The normal brake control routine, which is illustrated in the flow chart of FIG. 5, will be described.

To begin with, the normal brake control routine will be briefly explained.

The normal brake control routine includes various brake controls including: a basic control; an anti-lock control; a traction control; and a vehicle stability control (VSC). In the basic control, the motors 20, 30 are controlled to achieve a deceleration value of the vehicle corresponding to the operating force F acting on the brake pedal 34, while monitoring the angular positions and the electric currents of the motors 20, 30, and so as to establish an optimum distribution of the braking forces between the front wheels FL, FR and the rear wheels RL, RR, on the basis of the output signals of the operating force sensor 348, brake pedal switch 350, motor position sensors 362 and motor current sensors 364. In the anti-lock control, the motors 20, 30 are controlled to regulate the braking torques of the wheels, so as to prevent an excessively high locking tendency of each wheel, on the basis of the output signals of the brake pedal switch 350, wheel speed sensors 370, motor position sensors 362 and motor current sensors 364. In the traction control, the motors 20 or 30 (or 20 and 30) for the drive wheels are controlled to regulate the drive torques of the drive wheels, so as to prevent an excessively high spinning tendency of each drive wheel, on the basis of the output signals of the accelerator pedal switch 352, accelerator pedal operation amount sensor 353, wheel speed sensors 360, motor position sensors 362 and motor current sensors 364. In the vehicle stability control (VSC), the motors 20, 30 are controlled to regulate a difference between the braking forces of the front wheels FL, FR and the braking forces of the rear wheels RL, RR, so as to prevent an excessively high drift-out or spinning tendency of the running vehicle, on the basis of the output signals of the steering angle sensor 354, yaw rate sensor 455, lateral acceleration sensor 358, wheel speed sensors 360, motor position sensors 362 and motor current sensors 364.

The normal brake control routine will be described in detail by reference to the flow chart of FIG. 5.

The present normal brake control routine is repeatedly executed while an ignition switch of the vehicle is held ON. Each cycle of execution of the routine is initiated with step S1 to determine whether the brake pedal switch 350 is ON, namely, whether the brake pedal 34 is in the operated position for normal brake application to the vehicle. If an affirmative decision (YES) is obtained in step S1, the control flow goes to step S2 in which the basic control is effected. Step S2 is followed by step S3 to determine whether the anti-lock control is necessary, namely, whether any wheel has an excessively high locking tendency. If a negative decision (NO) is obtained in step S3, one cycle of execution of the present routine is terminated. If an affirmative decision (YES) is obtained in step S3, the control flow goes to step S4 in which the anti-lock control is effected. Step S4 is followed by step S5 to determine whether the anti-lock control becomes unnecessary. If the anti-lock control is still necessary, a negative decision (NO) is obtained in step S5, and the control flow goes back to step S4 to continue the anti-lock control. If the anti-lock control becomes unnecessary, an affirmative decision (YES) is obtained in step S5, and one cycle of execution of the routine is terminated.

If the brake pedal switch 350 is in the OFF state, a negative decision (NO) is obtained in step S1, and the control flow goes to step S6 to determine whether the traction control is necessary, namely, whether any drive wheel has an excessively spinning tendency. If an affirmative decision (YES) is obtained in step S6, the control flow goes to step S7 in which the traction control is effected. Step S7 is followed by step S8 to determine whether the traction control becomes unnecessary. If the traction control is still necessary, a negative decision (NO) is obtained in step S8, and the control flow goes back to step S7 to continue the traction control. If the traction control is becomes unnecessary, an affirmative decision (YES) is obtained in step S8, and one cycle of execution of the routine is terminated.

If the traction control is not necessary while the brake pedal switch 350 is OFF, that is, if the negative decision (NO) is obtained in both steps S1 and S6, the control flow goes to step S9 to determine whether the vehicle stability control is necessary, that is, whether the running vehicle has an excessively high drift-out or spinning tendency. If an affirmative decision (YES) is obtained in step S9, the control flow goes to step S10 in which the vehicle stability control is effected. Step S10 is followed by step S11 to determine whether the vehicle stability control becomes unnecessary. If the vehicle stability control is still necessary, a negative decision (NO) is obtained in step S11, and the control flow goes to step S10 to continue the vehicle stability control. If the vehicle stability control becomes unnecessary, an affirmative decision (YES) is obtained in step S11, and one cycle of execution of the routine is terminated.

Figure 6:
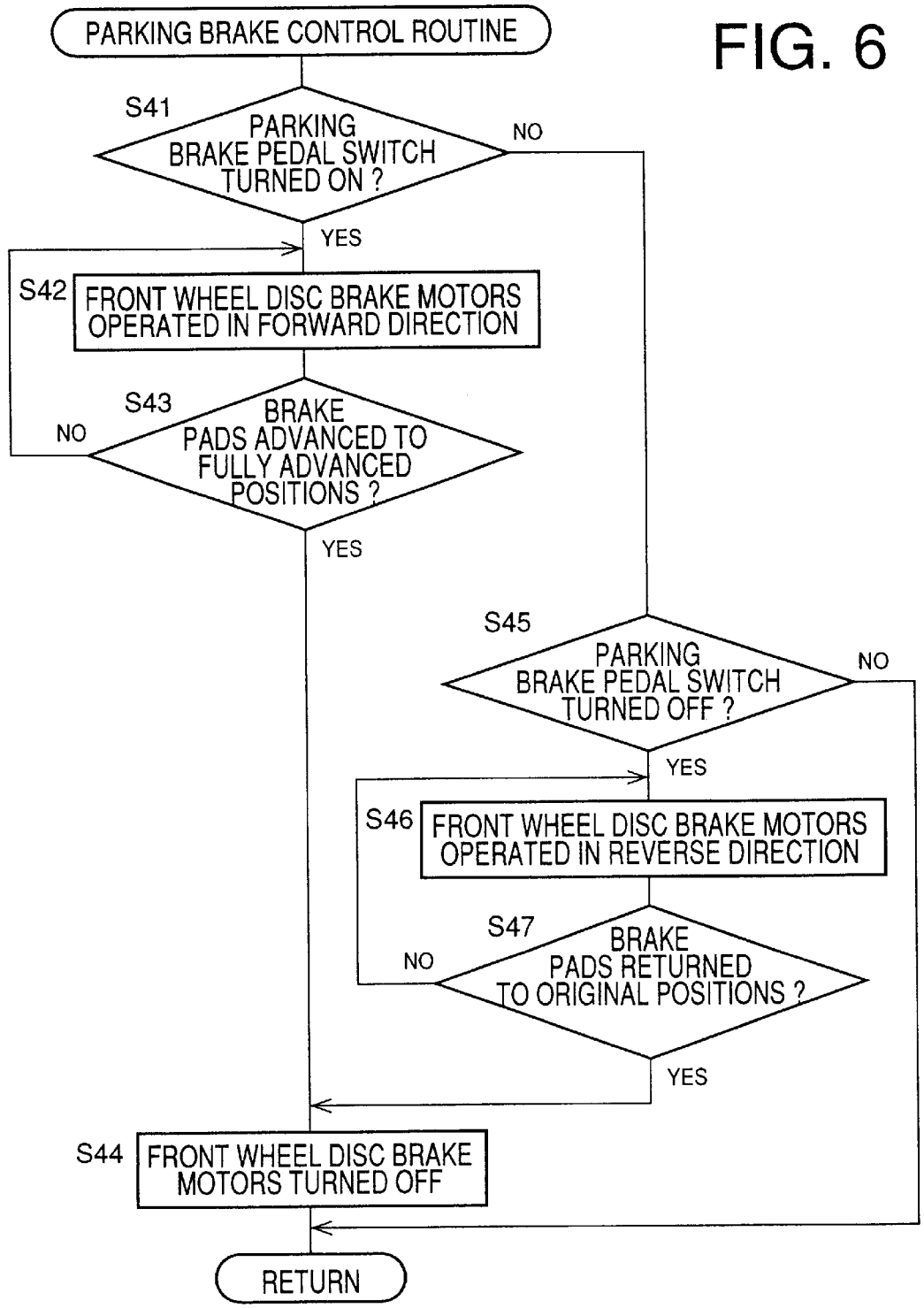
FIG. 6 is a flow chart illustrating a parking brake control routine also stored in the ROM.

The parking brake control routine is illustrated in the flow chart of FIG. 6.

This parking brake control routine is repeatedly executed regardless of whether the ignition switch is ON. Each cycle of execution of this routine is initiated with step S41 to determine whether the parking brake pedal switch 352 is turned from OFF to ON, that is, whether the parking brake pedal 35 has been depressed (whether the application of a parking brake is initiated). If an affirmative decision (YES) is obtained in step S41, the control flow goes to step S42 in which the ultrasonic motors 20 of the electrically operated disc brakes 22 for the front wheels FL, FR are operated in the forward direction to force the brake pads 106 onto the friction surfaces 102 of the disc rotor 104. Step S42 is followed by step S43 to determine whether the brake pads 106 have been moved to their fully advanced positions at which the brake pads 106 contact the friction surfaces 102 of the disc rotor 104. This determination in step S43 is effected on the basis of the signal indicating the operating state of the brake pads 106, for instance, on the basis of the output signals of the motor position sensors 362 or the braking force sensors 116. If a negative decision (NO) is obtained in step S43, the control flow goes back to step S42 to hold the ultrasonic motors 20 operated in the forward direction. If an affirmative decision (YES) is obtained in step S43, the control flow goes to step S44 in which the ultrasonic motors 20 are turned off. IN this state, the brake pads 106 are held in their fully advanced positions by the holding torques generated by the motors 20. Thus, one cycle of execution of the parking brake control routine of FIG. 6 is terminated.

If the parking brake pedal switch 351 is not turned from OFF to ON, a negative decision (NO) is obtained in step S41, and the control flow goes to step S45 to determine whether the parking brake pedal switch 351 is turned from ON to OFF, that is, whether the parking brake pedal 42 has been returned to the non-operated position. If an affirmative decision (YES) is obtained in step S45, the control flow goes to step S45 in which the ultrasonic motors 20 of the electrically operated disc brakes 22 of the front left and right wheels FL, FR are operated in the reverse direction to move the brake pads 106 away from the friction surfaces 102 of the disc rotor 104. Step S46 is followed by step S47 to determine whether the brake pads 106 have been returned to their original or non-braking positions. This determination is effected on the basis of the output signals of the motor position sensors 362, for example. If a negative decision (NO) is obtained in step S47, the control flow goes back to step S46 to hold the ultrasonic motors 20 operated in the reverse direction. If an affirmative decision (YES) is obtained in step S47, the control flow goes to step S44 to turn off the ultrasonic motors 20.

If the parking brake pedal switch 351 is held in the OFF or ON position, a negative decision (NO) is obtained in both steps S41 and S45. In this case, one cycle of execution of the routine of FIG. 6 is terminated, so that the brake pads 106 remain in the present positions.

The front disc brake diagnosing routine, which is illustrated in the flow chart of FIG. 7, will be described.

To begin with, the front disc brake diagnosing routine will be briefly explained.

Figure 7:
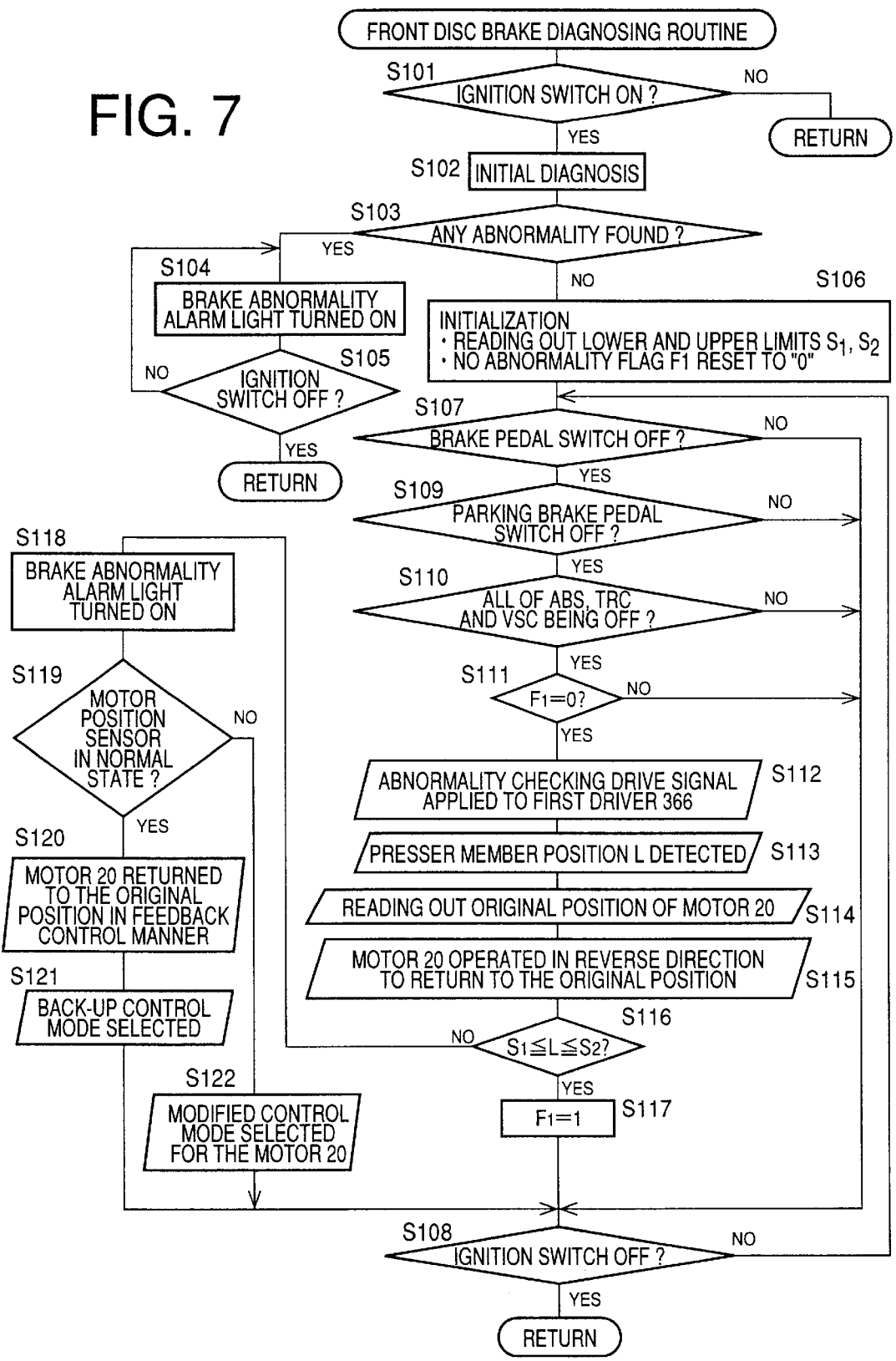
FIG. 7 is a flow chart illustrating a front disc brake diagnosing routine also stored in the ROM.

This front disc brake diagnosing routine of FIG. 7 is executed alternately for the front left and right wheels FL, FR. In the front disc brake diagnosing routine for each front wheel, an abnormality checking drive signal is applied to the first drive motor 366 to activate the corresponding ultrasonic motor 20 while neither the brake pedal 34 nor the parking brake pedal 42 is placed in the operated position. The magnitude of the abnormality checking drive signal is determined so that the amount of electric current supplied from the first battery 370 to the ultrasonic motor 20 permits the presser member 134 to be moved to a predetermined position defined by a nominal value $S_0$ if the ultrasonic motor 20 is normally functioning. With the thus determined abnormality checking drive signal applied to the first driver 766, the position L of the presser member 134 is detected. In this embodiment, the position L is not directly detected, but is indirectly detected by detecting the angular position of the motor 20 by the motor position sensor 362. Then, a determination is made as to whether a value corresponding to the detected position L falls within a range between a lower limit $S_1$ and an upper limit $S_2$. Namely, a determination is made as to whether the presser member 134 has been moved to a position sufficiently close to a nominal position defined by the nominal value $S_0$. If the value corresponding to the detected position L falls within the above-indicated range, the electrical system of the front disc brake 22 is determined to be normal. If not, the electrical system is determined to be abnormal or defective.

In the present embodiment, the nominal position defined by the nominal value $S_0$ is spaced apart a given distance from the fully advanced position of the presser member 134 at which the brake pads 106a, 106b contact the friction surface 102 of the disc rotor 104. This arrangement does not cause a change in the acceleration value of the vehicle due to the diagnosis of the electrically operated disc brakes 22 of the front wheels, which change would give a discomfort to the vehicle operator.

The front disc brake diagnosing routine will be described in detail by reference to the flow chart of FIG. 7.

The front disc brake diagnosing routine is repeatedly executed regardless of whether the ignition switch of the vehicle is placed in the ON or OFF position. Each cycle of execution of this routine is initiated with step S101 to determine whether the ignition switch is ON. If a negative decision (NO) is obtained in step S101, one cycle of execution of the present routine is terminated. If an affirmative decision (YES) is obtained in step S101, the control flow goes to step S102 to effect an initial diagnosis of the front disc brake 22, for any mechanical abnormality or or malfunction, or any electrical abnormality or defect such as disconnection of wires and short-circuiting. Step S102 is followed by step S103 to determine whether any electrical or mechanical abnormality, malfunction or defect of the disc brake 22 has been detected. If an affirmative decision (YES) is obtained in step S103, the control flow goes to step S104 to turn on the brake abnormality alarm light 376, to inform the vehicle operator of the presence of such an abnormality. Step S104 is followed by step S105 to determine whether the ignition switch is turned OFF. If the ignition switch is still in the ON state, a negative decision (NO) is obtained in step S105, and the control flow goes back to step S104 to hold the alarm light 376 in the ON state. If the ignition switch is turned OFF, an affirmative decision (YES) is obtained in step S105, and one cycle of execution of the routine is terminated.

If no abnormality of the front disc brake 22 has been detected in step S103, the control flow goes to step S106 to effect initialization of the electronic control unit 330, wherein the lower and upper limits $S_1$ and $S_2$ for the position L of the presser member 134 are read out from the ROM 342, and a NO ABNORMALITY flag F1 is reset to "0". When this flag F1 is set at "0", it means that the front disc brake 22 has not been diagnosed to be normal. When the flag F1 is set at "1", it means that the front disc brake 22 has been diagnosed to be normal.

Step S106 is followed by step S107 to determine whether the brake pedal switch 350 is placed in the OFF position, that is, whether the brake pedal 34 is placed in the non-operated position. If a negative decision (NO) is obtained in step S107, that is, if the brake pedal 34 is in the operated position, the control flow goes to step S108 to determine whether the ignition switch is turned OFF. If a negative decision (NO) is obtained in step s108, the control flow goes back to step S107. If an affirmative decision (YES) is obtained in step S108, one cycle of execution of this routine is terminated.

If the brake pedal switch 350 is placed in the OFF state, an affirmative decision (YES) is obtained in step S107, and the control flow goes to step S109 to determine whether the parking brake pedal switch 351 is placed in the OFF state. If a negative decision (NO) is obtained in step S109, the control flow goes to step S108. If an affirmative decision (YES) is obtained in step S109, the control flow goes to step S110 to determine whether all of the anti-lock control, traction control and vehicle stability control are off. This step S110 is provided to inhibit the diagnosis of the ultrasonic motor 20 during any of the anti-lock, traction and vehicle stability controls, since the diagnosis may have an adverse influence on the control. If a negative decision (NO) is obtained in step S110, that is, if the anti-lock, traction or vehicle stability control is performed, the control flow goes to step S108, thereby inhibiting the diagnosis of the ultrasonic motor 20. If an affirmative decision (NO) is obtained in step S110, the control flow goes to step S111 to determine whether the NO ABNORMALITY flag F1 is set at "0". If the flag F1 is set at "1", that is, the front disc brake 22 has been diagnosed to be normal, the control flow goes to step S108. If the flag F1 is set at "0", that is, if the front disc brake 22 has not yet been diagnosed to be normal, the control flow goes to step S112 and the subsequent steps to diagnose the front disc brake 22 any electrical abnormality.

Steps S112–S116 are implemented for the front disc brake 22 of the front wheel under examination.

In step S112, the predetermined abnormality checking drive signal is applied to the first driver 366. Step S112 is followed by step S113 to detect the position L of the presser member 134 by detecting the angular position of the ultrasonic motor 20 under examination, on the basis of the output signal of the corresponding motor position sensor 362. Then, the control flow goes to step S114 in which data indicative of the original or non-braking position of the ultrasonic motor 20 are read out from the RAM 344. The original position of the ultrasonic motor 20 is determined in the front disc brake wear monitoring routine of FIG. 9 (which will be described) and stored in the RAM 344. Step S114 is followed by step S115 in which the ultrasonic motor 20 is operated in the reverse direction to the original position. Then, the control flow goes to step S116 to determine whether the value corresponding to the detected position L of the presser member 134 falls within the range between the lower and upper limits $S_1$, $S_2$. If an affirmative decision (YES) is obtained in step S116, that is, if the front disc brake 22 is found normal, the control flow goes to step S117 to set the NO ABNORMALITY flag F1 to "1". Step S117 is followed by step S108.

If the value corresponding to the detected position L does not fall within the specified range, a negative decision (NO) is obtained in step S116, and the control flow goes to step S118 in which the brake abnormality alarm light 376 is turned ON, to inform the vehicle operator of the presence of an abnormality of the front disc brake 22 under examination. Step S118 is followed by step S119 to determine whether the motor position sensor 362 is normally functioning without any abnormality or defect such as wire disconnection and short-circuiting. This step S119 is provided to check whether the negative decision (NO) was obtained in step S116 due to an abnormality of the ultrasonic motor 20 per se, or due to an abnormality of the corresponding motor position sensor 362. If the motor position sensor 362 is normally functioning, an affirmative decision (YES) is obtained in step S119, and the control flow goes to step S120 in which the ultrasonic motor 20 is operated to the original or non-braking position in a feedback manner while monitoring the actual angular position of the motor 20 on the basis of the output signal of the motor position sensor 362. Then, step S121 is implemented to select a back-up control mode for the normal brake control routine of FIG. 5. In this back-up control mode, the vehicle is braked by the normally functioning three brakes, that is, the normally functioning front disc brake 22 and the two rear drum brakes 32, such that the braking force that would be generated by the front disc brake 22 which has been detected to be abnormal is compensated for by the three normally functioning brakes 22, 32, so as to prevent generation of a yawing moment of the vehicle due to zeroing of the braking force generated by the abnormal front disc brake 22.

Figure 5:
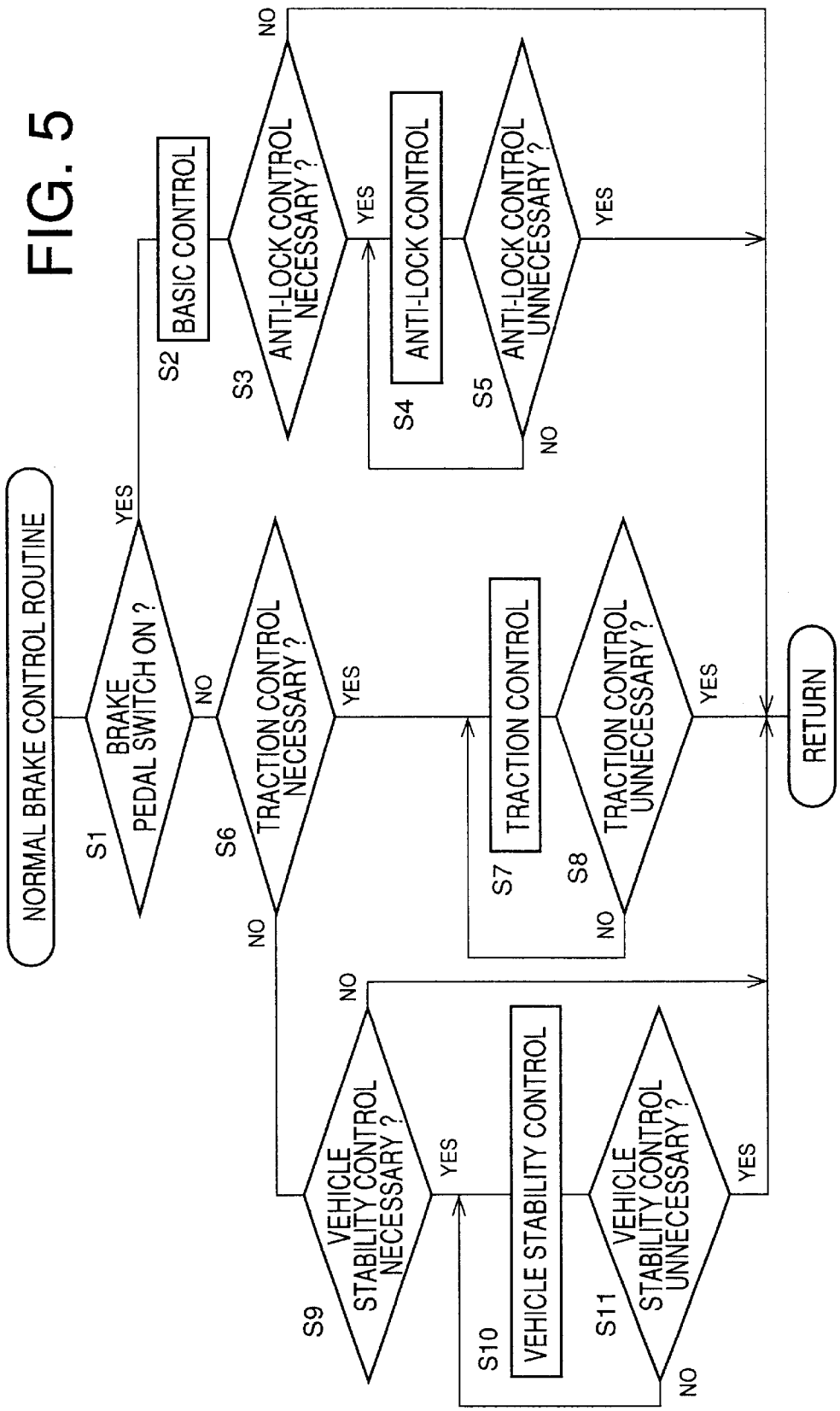
FIG. 5 is a flow chart illustrating a normal brake control routine stored in a ROM of a computer of an electronic control unit provided in the braking system of FIG. 1.

If the motor position sensor 362 is abnormal, a negative decision (NO) is obtained in step S119, and the control flow goes to step S112 to select a modified control mode for the normal brake control routine of FIG. 5. In this modified control mode, the ultrasonic motor 20 which is considered to be normal is controlled without using the output signal of the motor position sensor 362. For instance, the ultrasonic motor 20 is controlled in a feedback or closed-loop control manner on the basis of at least one of the output signals of the braking force sensor 116 and the motor current sensor 364, or in an open-loop control manner without detecting the angular position of the motor 20.

As described above, where the ultrasonic motor 20 under examination is detected to be abnormal without any abnormality of the motor position sensor 362, this motor 20 is placed in its non-braking position, and the vehicle is braked in the back-up control mode with the normally functioning three brakes 22, 32. Where the negative decision (NO) is obtained in step S116 due to an abnormality of the motor position sensor 362, the ultrasonic motor 20 under examination which is considered normal is controlled in the modified control mode without using the abnormal motor position sensor 362, so as to avoid an adverse influence of the abnormal position sensor 362 on the operation of the ultrasonic motor 20. In this case, the vehicle is braked with the four brakes 22, 32 of the four wheels FL, FR, RL, RR>

The rear drum brake diagnosing routine, which is illustrated in the flow chart of FIG. 8, will be described. This rear drum brake diagnosing routine is similar to the front disc brake diagnosing routine of FIG. 7 in some aspects, which will be only briefly explained. The other aspects of the rear drum brake diagnosing routine will be explained in detail.

To begin with, the rear drum brake diagnosing routine will be briefly explained.

This rear drum brake diagnosing routine is executed alternately for the rear left and right wheels RL, RR. In the rear drum brake diagnosing routine for each rear wheel, a first abnormality checking drive signal is applied to the second drive motor 368 to activate the corresponding DC motor 30 while neither the brake pedal 34 nor the emergency brake pedal 35 is placed in the operated position. The magnitude of the first abnormality checking drive signal is determined so that the amount of electric current supplied from the second battery 372 to the DC motor 30 permits the lever 230 to be moved to a predetermined first position defined by a first nominal value $T_{10}$ if the DC motor 30 is normally functioning. Then, a second abnormality checking drive signal is applied to the second drive motor 368 to activate the corresponding DC motor 30. The magnitude of the second abnormality checking drive signal is determined so that the amount of electric current supplied from the second battery 372 to the DC motor 30 permits the lever 230 to be moved to a predetermined second position defined by a second nominal value $T_{20}$ if the DC motor 30 is normally functioning. The second nominal value $T_{20}$ is smaller than the first nominal value $T_{10}$. With the thus determined first and second abnormality checking drive signals applied to the second driver 768, first and second positions $M_1$ and $M_2$ of the lever 230 are detected, respectively. In this embodiment, the positions $M_1$ and $M_2$ are detected directly by the brake position sensor 285 (FIG. 3). Then, a determination is made as to whether a value corresponding to the first detected position $M_1$ is equal to or larger than a predetermined first reference value $T_1$, while at the same time a value corresponding to the detected second position $M_2$ is equal to or smaller than a predetermined second reference value $T_2$ which is smaller than the first reference value $T_1$. The values corresponding to the first and second positions $M_1$, $M_2$ correspond to respective distances from the original or non-braking positions of the brake linings 216 which are most distant from the friction surface 202 of the drum 204 in the radial direction of the drum 204. If an affirmative decision is obtained in the above determination, the electrical system of the rear drum brake 32 under examination is considered to be normal. If a negative decision is obtained in the determination, the electrical system of the rear drum brake 32 is considered to be abnormal.

In the present embodiment, the first and second nominal values $T_{10}$ and $T_{20}$ are determined such that the brake linings 216a, 216b are spaced apart a given distance from the friction surface 202. This determination does not cause a change in the acceleration value of the vehicle due to the diagnosis of the electrically operated drum brakes 32 of the rear wheels, which change would give a discomfort to the vehicle operator. In the present embodiment, the first nominal value $T_{10}$ is determined to move the brake linings 216a, 216b to a position close to the position at which the brake linings contact the friction surface 202, while the second nominal value $T_{20}$ is determined such that the brake linings 216a, 216b remain at their original or non-braking innermost positions. Accordingly, the second abnormality checking drive signal applied to the second driver 368 does not cause an electric current to be applied from the second battery 372 to the DC motor 30.

The rear drum brake diagnosing routine will be described in detail by reference to the flow chart of FIG. 8. However, the features of this routine of FIG. 8 which are similar to those of the routine of FIG. 7 will be only briefly explained.

The rear drum brake diagnosing routine, which is also repeatedly executed regardless of whether the ignition switch of the vehicle is placed in the ON or OFF position, includes steps S151–S155 similar to steps S101–S105 of the front disc brake diagnosing routine. Where no mechanical and electrical abnormality or malfunction of the rear drum brake 32 is found in the initial diagnosis in step S153, the control flow goes to S156 to effect initialization of the electronic control unit 330. wherein the above-indicated first and second reference values $T_1$ and $T_2$ for the positions $M_1$ and $M_2$ of the lever 230 are read out from the ROM 342, and a NO ABNORMALITY flag F2 is reset to "0". When this flag F2 is set at "0", it means that the rear drum brake 32 has not been diagnosed to be normal. When the flag F2 is set at "1", it means that the rear drum brake 32 has been diagnosed to be normal.

Step S156 is followed by step S157 to determine whether the brake pedal switch 350 is placed in the OFF position, that is, whether the brake pedal 34 is placed in the non-operated position. If a negative decision (NO) is obtained in step S157, that is, if the brake pedal 34 is in the operated position, the control flow goes to step S158 to determine whether the ignition switch is turned OFF. If a negative decision (NO) is obtained in step S158, the control flow goes back to step S157. If an affirmative decision (YES) is obtained in step S158, one cycle of execution of this routine is terminated.

If the brake pedal switch 350 is placed in the OFF state, an affirmative decision (YES) is obtained in step S157, and the control flow goes to step S159 to determine whether the emergency brake pedal switch 349 is placed in the OFF state. This step S159 is provided to inhibit the diagnosis of the electrically operated rear drum brake 32 during operation of the mechanically operated drum brake 36, since the lever 230 is commonly used for the electrically and mechanically operated rear drum brakes 32, 36. That is, the diagnosis of the drum brake 32 cannot be suitably effected during operation of the drum brake 36. If a negative decision (NO) is obtained in step S159, the control flow goes to step S158. If an affirmative decision (YES) is obtained in step S159, the control flow goes to step S160 to determine whether all of the anti-lock control, traction control and vehicle stability control are off. If a negative decision (NO) is obtained in step S160, that is, if the anti-lock, traction or vehicle stability control is performed, the control flow goes to step S168, thereby inhibiting the diagnosis of the ultrasonic motor 20. If an affirmative decision (NO) is obtained in step S160, the control flow goes to step S161 to determine whether the NO ABNORMALITY flag F2 is set at "0". If the flag F2 is set at "1", that is, the rear drum brake 32 has been diagnosed to be normal, the control flow goes to step S158. If the flag F2 is set at "0", that is, if the rear drum brake 32 has not yet been diagnosed to be normal, the control flow goes to step S162 and the subsequent steps to diagnose the DC motor 30 for any electrical abnormality.

Steps S162–S166 are implemented for the rear drum brake 32 of the rear wheel under examination.

In step S162, the predetermined first abnormality checking drive signal is applied to the second driver 368. Step S162 is followed by step S163 to detect the first position $M_1$ of the lever 230 on the basis of the corresponding brake position sensor 285. Then, the control flow goes to step S164 in which the second abnormality checking drive signal is applied to the second driver 368. Step S164 is followed by step S165 to detect the second position $M_2$ of the lever 230 on the basis of the corresponding brake position sensor 285.

Then, the control flow goes to step S166 to determine whether the value corresponding to the detected first position $M_1$ of the lever 230 is equal to or larger than the first reference value $T_1$ while at the same time the value corresponding to the detected second position $M_2$ is equal to or smaller than the second reference value $T_2$. If an affirmative decision (YES) is obtained in step S166, that is, if the rear drum brake 32 is found normal, the control flow goes to step S167 to set the NO ABNORMALITY flag F2 to "1". Step S167 is followed by step S158.

If the value corresponding to the detected first position $M_1$ is smaller than the first reference value $T_1$ or if the value corresponding to the detected second position $M_2$ is larger than the first reference value $T_2$, a negative decision (NO) is obtained in step S166, and the control flow goes to step S168 in which the brake abnormality alarm light 376 is turned ON, to inform the vehicle operator of the presence of an abnormality of the rear drum brake 32 under examination. Step S168 is followed by step S169 to determine whether the corresponding brake position sensor 285 is normally functioning without any abnormality or defect such as wire disconnection and short-circuiting. This step S169 is provided to check whether the negative decision (NO) was obtained in step S166 due to an abnormality of the DC motor 30 per se, or due to an abnormality of the corresponding brake position sensor 285. If the brake position sensor 285 is normally functioning, an affirmative decision (YES) is obtained in step S169, and the control flow goes to step S170 in which the DC motor 30 is operated to the original or non-braking position in a feedback manner while monitoring the actual angular position of the DC motor 30 on the basis of the output signal of the motor position sensor 362. Then, step S171 is implemented to select a back-up control mode for the normal brake control routine of FIG. 5. In this back-up control mode, the vehicle is braked by the normally functioning three brakes, that is, the two front disc brakes 22 and the normally functioning rear drum brake 32, such that the braking force that would be generated by the rear drum brake 32 which has been detected to be abnormal is compensated for by the three normally functioning brakes 22, 32, so as to prevent generation of a yawing moment of the vehicle due to zeroing of the braking force generated by the abnormal rear drum disc brake 32.

If the brake position sensor 285 is abnormal, a negative decision (NO) is obtained in step S169, and the control flow goes directly to step S158. That is, the rear drum brake diagnosing routine does not include a step corresponding to step S122 of the front disc brake diagnosing routine. In this respect, it is noted that the brake position sensor 285 is not used in the normal braking operation. However, the brake position sensor 285 may be used in the normal braking operation. In this case, a modified control mode similar to that selected in step S122 of the front disc brake diagnosing routine of FIG. 7 may be selected if the negative decision (NO) is obtained in step S169. In this modified control mode, the DC motor 30 is controlled without using the output signal of the abnormal brake position sensor 285.

Figure 8:
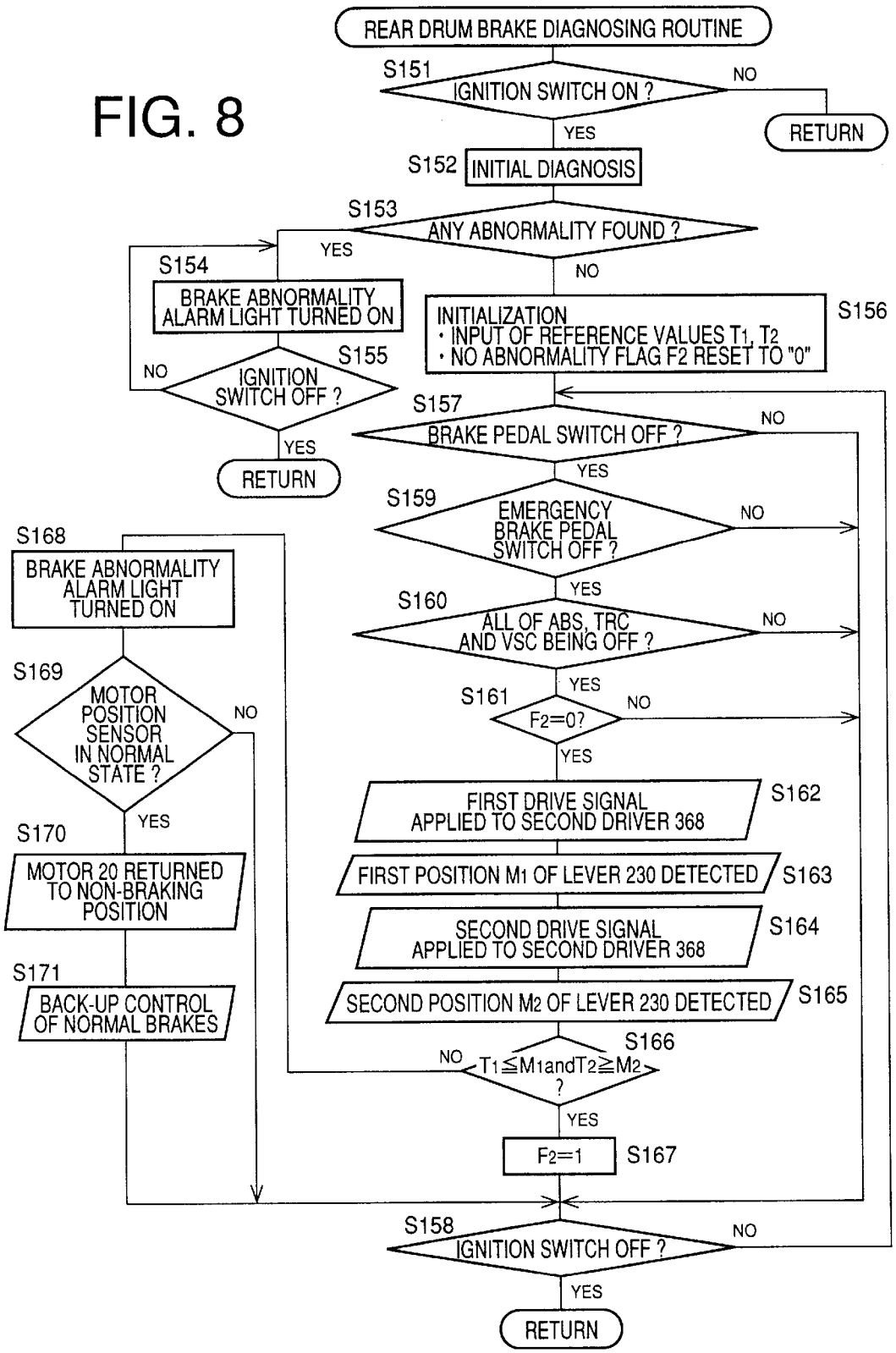
FIG. 8 is a flow chart illustrating a rear disc brake diagnosing routine also stored in the ROM.

In the present embodiment, the front disc brake diagnosing routine of FIG. 7 and the rear drum brake diagnosing routine of FIG. 8 are both formulated such that the operations of the motors 20, 30 do not result in brake application to the vehicle. However, these diagnosing routines may be formulated such that the motors 20, 30 are operated so as to apply a brake to the vehicle. In this case, it is desirable to execute the diagnosing routines of FIGS. 7 and 8 at different times to activate the front disc brakes 22 and the rear drum brakes 32 by operations of the ultrasonic motors 20 and the DC motors 30 at different times, so that the execution of the diagnosing routines will not cause a considerable degree of deceleration of the vehicle, so as not to give the vehicle operator a discomfort due to the unexpected vehicle deceleration. In the present embodiment wherein the operations of the motors 20, 30 do not cause deceleration of the vehicle, it is not essential to execute the two diagnosing routines of FIGS. 7 and 8 at different times.

The front disc brake wear monitoring routine, which is illustrated in the flow chart of FIG. 9, will be described.

To begin with, the front disc brake wear monitoring routine will be briefly explained.

The present front disc brake wear monitoring routine is executed alternately for the front left and right wheels FL, FR, to operate the corresponding ultrasonic motor 20 while the brake pedal 34 is in the non-operated position. The ultrasonic motor 20 is stopped when the pair of brake pads 106a, 106b have been brought into contact with the disc rotor 104, that is, when the presser member 134 has been moved to its advanced position. This advanced position changes with an increase in the amount of wear of the brake pads 106a, 106b. The advanced position is detected by detected by the angle of rotation of the ultrasonic motor 20 from its original non-braking position to the braking position. This angle of rotation, is referred to as "contact angle $\theta$" of the motor 20, increases with an increase in the amount of wear of the brake pads 106a, 106b. The present front disc brake wear monitoring routine is adapted to determine that the amount of wear of the brake pads 106 (front disc brake 22) is excessively large, if the contact angle $\theta$ is larger than a predetermined upper limit $\theta_0$.

The moment when the presser member 134 has reached a position at which the brake pads 106a, 106b begin to contact the disc rotor 104 can be detected by the braking force sensor 116. Like other sensors, the braking force sensor 116 has a minimum detectable amount $P_0$. The present routine of FIG. 9 is adapted to determine that the brake pads 106a, 106b have been brought into contact with the disc rotor, when the braking force sensor 116 has detected the minimum detectable amount $P_0$. At this time, the angle of rotation (namely, contact angle $\theta$) of the ultrasonic motor 20 is detected.

After the contact angle $\theta$ of the ultrasonic motor 20 has been detected, the motor 20 is operated in the reverse direction by a predetermined angle $\Delta\theta$, so that the presser member 134 is retracted in the direction away from the disc rotor 104 by a predetermined distance corresponding to the predetermined angle $\Delta\theta$.

Then, the front disc brake wear monitoring routine will be described in detail by reference to the flow chart of FIG. 9.

The routine is initiated with step S201 to determine whether the brake pedal switch 350 is placed in the OFF state, namely, to determine whether the brake pedal 34 is in the non-operated position. If a negative decision (NO) is obtained in step S201, one cycle of execution of the present routine is terminated. If an affirmative decision (YES) is obtained in step S201, the control flow goes to step S202 in which an actual pressing force $P_A$ by which the inner pad 106b is pressed by the presser member 134 onto the disc rotor 104 is detected by the braking force sensor 116. Step S202 is followed by step S203 to determine whether the detected actual pressing force $P_A$ is smaller than the minimum detectable amount $P_0$. If an affirmative decision (YES) is obtained in step S203, the control flow goes to step S204 in which a wear checking drive signal is applied to the first driver 366 to apply a motor forwarding signal to the ultrasonic motor 20, for operating the motor 20 in the forward direction. Then, the control flow goes back to step S202. If the detected actual pressing force $P_A$ is not smaller than the minimum detectable amount $P_0$, a negative decision (NO) is obtained in step S203, and the control flow goes to step S205 to determine whether the detected actual pressing force $P_A$ is substantially equal to the minimum detectable amount $P_0$, that is, whether the presser member 134 has been moved to the position at which the inner pad 106b has begun to contact the disc rotor 104. If the actual pressing force $P_A$ has exceeded the minimum detectable amount $P_0$, a negative decision (NO) is obtained in step S205, and the control flow goes to step S206 to determine whether the motor forwarding signal is being applied to the ultrasonic motor 20. If an affirmative decision (YES) is obtained in step S206, the control flow goes to step S207 in which the motor 20 is first turned OFF and is then operated in the reverse direction with a motor reversing signal being applied thereto. Then, the control flow goes back to step S202. If the motor forwarding signal is not being applied to the motor 20, a negative decision (NO) is obtained in step S206, and the control flow goes to step S208 in which the motor 20 is operated in the reverse direction. In either case, the presser member 134 is retracted since the detected actual pressing force $P_A$ is excessively large.

If the detected actual pressing force $P_A$ is substantially equal to the the minimum detectable amount $P_0$, an affirmative decision (YES) is obtained in step S205, and the control flow goes to step S209 to turn OFF the ultrasonic motor, and then to step S210 in which the contact angle θ of the ultrasonic motor 20 is detected on the basis of the output signal of the motor position sensor 362, which represents the current angular position θ of the motor 20. Then, step S211 is implemented in which a motor reversing signal is applied to the ultrasonic motor 20, so that the motor 20 is operated in the reverse direction by the predetermined angle Δθ. This angle Δθ is determined to provide a suitable amount of gap between the brake pads 106a, 106b and the friction surfaces 102 of the disc rotor 104, which is necessary to prevent dragging of the brake pads 106 by the disc rotor 104 due to frictional contact therebetween. It is desirable to take account of an uneven wearing of the brake pads 106, when this angle Δθ is determined. With the reverse operation of the ultrasonic motor 20, the presser member 134 is located at a position which is spaced from the position at which the inner pad 106b contacts the disc rotor 104. Step S211 is followed by step S212 to determine whether the contact angle θ of the ultrasonic motor 20 is larger than the predetermined upper limit $θ_0$, that is, whether the amount of wear of the brake pads 106 is excessively large. If an affirmative decision (YES) is obtained in step S212, the control flow goes to step S213 to turned on the brake wear alarm light 378, to inform the vehicle operator that the amount of wear of the brake pads 106 of the front disc brake 22 under examination is excessively large. If a negative decision (NO) is obtained in step S212, one cycle of execution of the present routine is terminated, without step S213 being implemented.

The rear drum brake wear monitoring routine, which is illustrated in the flow chart of FIG. 10, will be described.

To begin with, the rear drum brake wear monitoring routine will be briefly explained.

Figure 11:
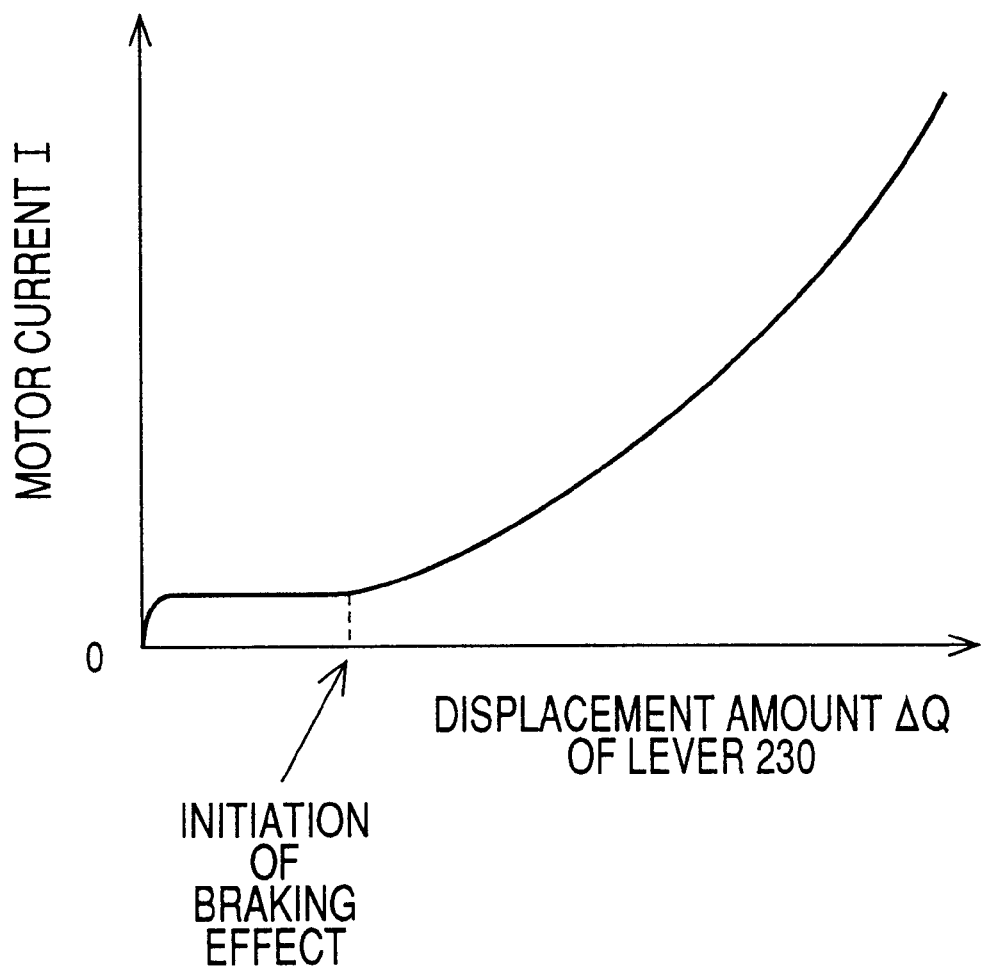
FIG. 11 is a graph for explaining the principle of operation of the rear drum brake wear monitoring routine of FIG. 10.

The present routine is executed alternately for the rear right and left wheels RL, RR, to activate the corresponding DC motor 30 when the brake pedal 34 is depressed. In the rear drum brakes 32, an amount of displacement ΔQ of the lever 230 by the DC motor 30 increases with an increase in the amount of wear of the brake linings 216a, 216b. While the amount of wear of the brake linings 216a, 216b is zero, the electric current I of the DC motor 30 increases, as indicated in the graph of FIG. 11, with an increase in the amount of displacement ΔQ of the lever 230 from its original non-braking position $Q_0$ to a position at which the brake linings 216a, 216b contact the friction surface 202 of the drum 204 to initiate a braking effect. Therefore, a normal value $ΔQ_N$ of the displacement amount ΔQ of the lever 230 can be determined on the basis of the detected actual electric current I of the DC motor 30, and according to the known relationship between the displacement amount ΔQ and the electric current I, which relationship is stored in the ROM 342.

Based on the above finding, the relationship between the normal displacement amount $ΔQ_N$ of the lever 230 and the electric current I of the DC motor 30 is stored in the ROM 342, and the actual electric current I is detected upon operation of the brake pedal 34, so that the normal displacement amount $ΔQ_N$ is determined on the basis of the detected actual electric current I and according to the stored $ΔQ_N$-I relationship. Then, the actual displacement amount $Δ_{QA}$ of the lever 230 between its original non-braking position $Q_0$ and its operated position $Q_1$ for contact of the brake linings 216a, 216b with the drum 204 is detected. A determination is made as to whether a difference of the detected actual displacement amount ΔQA from the normal displacement amount $ΔQ_N$ is equal to or larger than a predetermined upper limit N. If this difference is equal to or larger than the upper limit N, it is determined that the amount of wear of the brake linings 216a, 216b is excessively large.

Then, the rear drum brake wear monitoring routine will be described in detail by reference to the flow chart of FIG. 10.

The present routine is initiated with step S251 to determine whether the ignition switch is placed in the ON state. If a negative decision (NO) is obtained in step S251, one cycle of execution of the present routine is terminated. If an affirmative decision (YES) is obtained in step S251, the control flow goes to step S252.

Step S252 is provided to effect initialization wherein a provisional value A for the original position $Q_0$ and the upper limit N are read out from the ROM 342. The provisional value A is initially used as the original position $Q_0$ of the lever 230. Further, a WEAR CHECK COMPLETION flag F3 is reset to "0". When this flag F3 is set at "0", it means that the checking of the rear drum brake 32 for an excessive amount of wear of the brake linings 216 has already been effected. When the flag F3 is set at "1", it means that the checking has not been effected. Step S252 is followed by step S253 to determine whether the brake pedal switch 350 is in the ON state, that is, whether the brake pedal 34 is in the operated position. If a negative decision (NO) is obtained in step S253, the control flow goes to step S254 to determine whether the emergency brake pedal switch 349 is placed in the OFF state. If an affirmative decision (YES) is obtained in step S254, the control flow goes to step S255 in which the actual position Q of the lever 230 is detected on the basis of the output signal of the brake position sensor 285. Step S255 is followed by step S256 in which the detected position Q is stored in the RAM 344, as the original non-braking position $Q_0$ of the lever 230. Namely, the original position $Q_0$ stored in the RAM 344 is changed from the position of the provisional value A to the detected actual position Q. If a negative decision (NO) is obtained in step S254, the control flow goes to step S257 while skipping steps S255 and S256. In this respect, it is noted that there does not exit the above-indicated relationship between the motor current I and the displacement amount $\Delta Q$ of the lever 230 while the mechanically operated drum brake 36 is operated with the emergency brake pedal 35 being depressed. A monitoring of the brake linings 216 for excessive wear in this state may not provide an accurate result. When the brake pedal switch 350 is OFF, the control flow goes to step S257 irrespective of whether the emergency brake pedal switch 349 is OFF or ON, step S257 is implemented to determine whether the ignition switch is OFF. If an affirmative decision (YES) is obtained in step S257, one cycle of execution of the present routine is terminated. If a negative decision (NO) is obtained in step S257, the control flow goes back to step S253.

If the brake pedal switch 350 is ON, an affirmative decision (YES) is obtained in step S253, and the control flow goes to step S258 to determine whether the emergency brake pedal switch 349 is OFF. If an affirmative decision (YES) is obtained in step S258, the control flow goes to step S260 and the following steps. If a negative decision (NO) is obtained in step S258, the control flow goes to step S257, to inhibit the monitoring of the brake linings 216 for excessive wear. Step S260 is provided to determine whether the WEAR CHECK COMPLETION flag F3 is set at "0". If an affirmative decision (YES) is obtained in step S260, the control flow goes to step S261 and the following steps. If a negative decision (YES) is obtained, the control flow goes to step S257 to inhibit the monitoring of the brake linings 216 for excessive wear.

In step S261, the electric current I applied to the DC motor 30 is detected by the motor current sensor 264. Step S261 is followed by step S262 in which the present position Q of the lever 230 is detected by the brake position sensor 285. Step S262 is followed by step S263 in which the detected position Q is stored in the RAM 344 as the position $Q_1$. Then, the control flow goes to step S264 in which the normal displacement amount $\Delta Q_N$ of the lever 230 is determined on the basis of the detected electric current I and according to the $\Delta Q_N$-I relationship stored in the ROM 342. Step S264 is followed by step S265 in which the actual displacement amount $\Delta Q_A$ of the lever 230 is calculated based on the original position $Q_0$ and the operated position $Q_1$. Step S265 is followed by step S266 to determine whether the difference of the actual displacement amount $\Delta Q_A$ from the normal displacement amount $\Delta Q_N$ is equal to or larger than the upper limit N. If an affirmative decision (YES) is obtained in step S266, the control flow goes to step S267 to turn on the brake wear abnormality alarm light 378, to inform the vehicle operator that the amount of wear of the brake linings 216a, 216b is excessively large. Then, step S268 is implemented to set the WEAR CHECK COMPLETION flag F3 to "1". Step S268 is followed by step S257.

Figure 10:
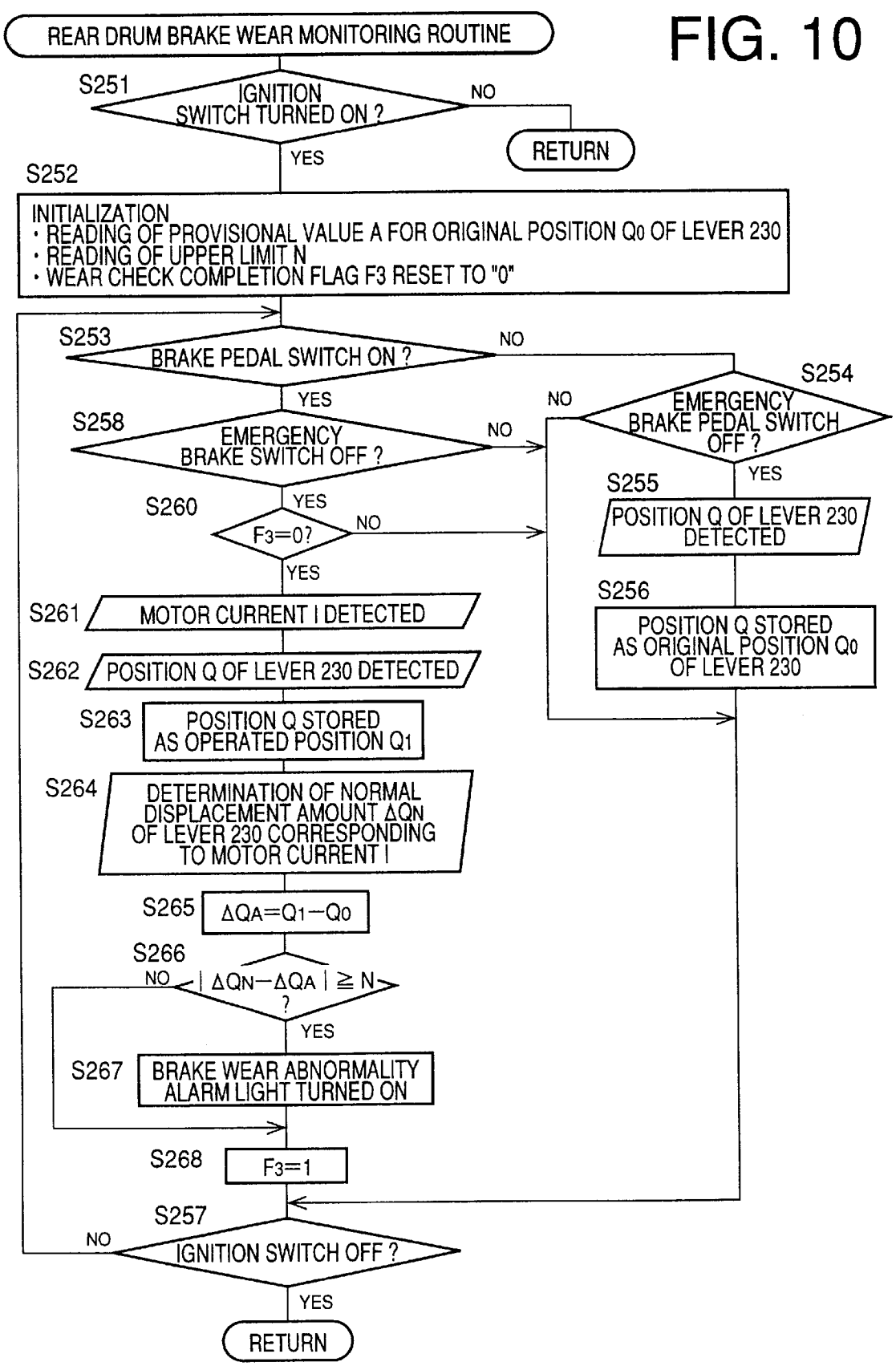
FIG. 10 is a flow chart illustrating a rear disc brake wear monitoring routine also stored in the ROM.

In the present rear drum brake wear monitoring routine of FIG. 10, not only the operated position $Q_1$ but also the original position $Q_0$ of the lever 230 are detected to calculate the actual displacement amount $\Delta Q_A$ of the lever 230, so that the actual displacement amount $\Delta Q_A$ is compared with the normal displacement amount $\Delta Q_N$, to determine whether the amount of the brake linings 216 is excessively large. However, the checking of the wear amount may be effected based on only the detected operated position $Q_1$ of the lever 230 as compared with the determined normal operated position.

There will next be described a second embodiment of this invention, which is identical with the first embodiment in many aspects. The same reference signs as used in the first embodiment will be used in the second embodiment to identify the corresponding elements, and only the feature characteristic of the second embodiment will be described.

Figure 12:
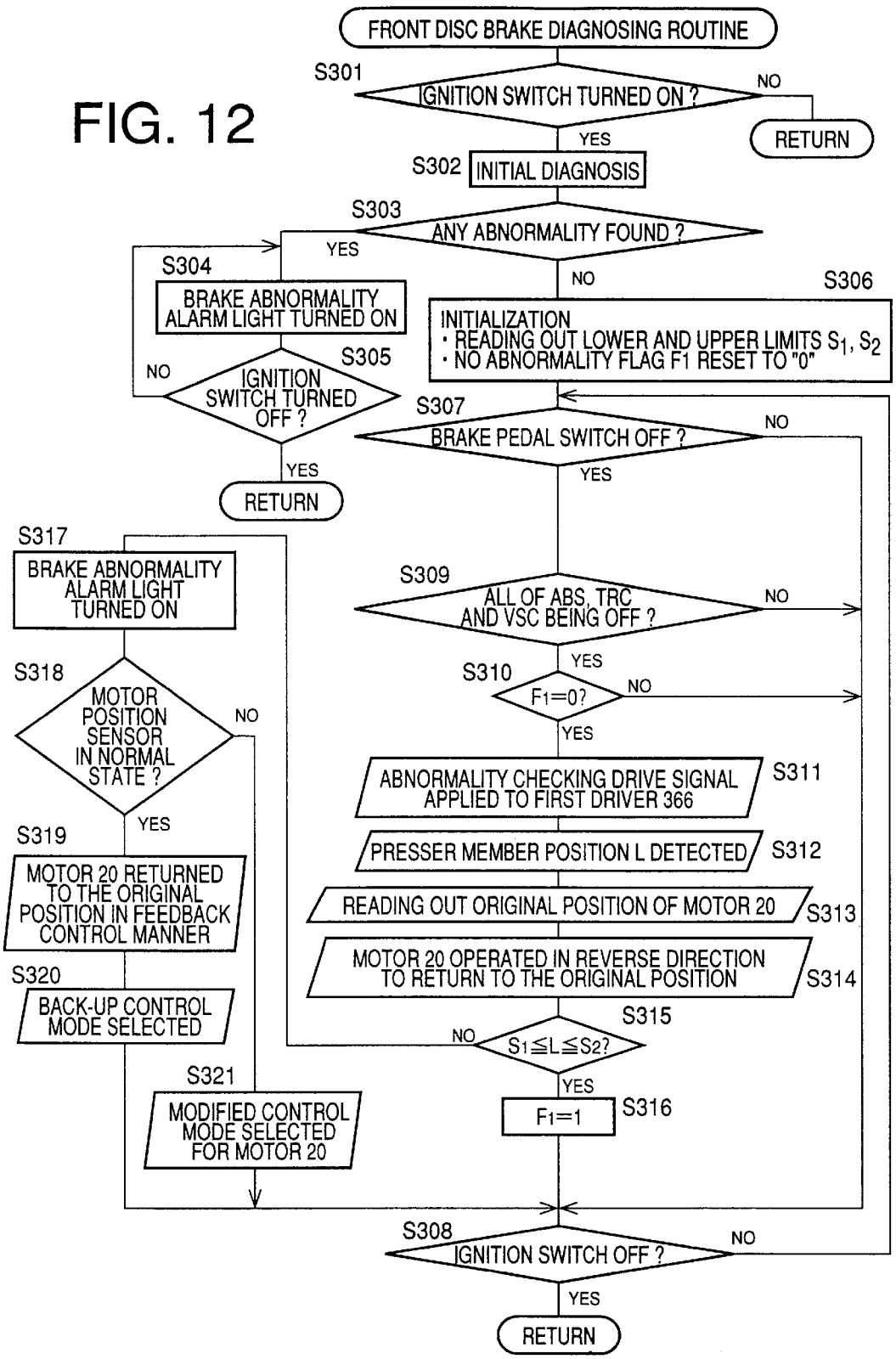
FIG. 12 is a flow chart illustrating a front disc brake diagnosing routine stored in a ROM of a computer of an electronic control unit provided in a braking system according to a second embodiment of this invention.

Each electrically operated front disc brake 22 of the second embodiment uses a DC motor in place of the ultrasonic motor 20 used in the first embodiment. The front disc brake diagnosing routine executed in the second embodiment is illustrated in the flow chart of FIG. 12. This routine does not include step S108 implemented in the routine of FIG. 7 of the first embodiment. Although the routine of FIG. 7 is formulated to inhibit the diagnosis of the front disc brake 22 for abnormality when the parking brake switch 351 is ON, the routine of FIG. 12 of the second embodiment is formulated to permit the diagnosis even when the parking brake pedal 42 is operated, since the DC motor of the front disc brake 22 is not activated when the parking brake pedal 42 is operated. In this respect, it is noted that unlike the ultrasonic motor 20, the DC motor does not generate a holding torque sufficient to apply a parking brake to the front wheel.

In the present second embodiment, the mechanically operated rear drum brakes 36 are used as not only the emergency brake but also the parking brake. Accordingly, the emergency brake pedal 35 is used as not only the emergency brake operating member but also the parking brake operating member.

A third embodiment of this invention will be described. This embodiment is similar to the first embodiment. Only the feature characteristic of this third embodiment will be described.

In the diagnosis of the front disc brakes 22 and the rear drum brakes 32 in the first embodiment, the motors 20, 30 are operated so as not to cause the friction members 106, 216 to contact the disc rotor 104 or drum 204, so that the brakes 22, 32 do not provide a substantial braking effect. In the present third embodiment, an abnormality checking drive signal applied to the driver 366, 368 is determined such that the motors 20, 30 are operated to a position at which the friction members contact the friction surface or surfaces of the disc rotor 104 or drum 204, with a comparatively low contact pressure therebetween. In this state, a braking force $f_A$ generated by the brake 22, 32 is detected, and a determination is made as to whether the detected braking force $f_A$ falls within a predetermined allowable range. If the braking force $f_A$ do not fall within the allowable range, the brakes 22, 32 are diagnosed to be abnormal or defective. In the present embodiment wherein the motors 20, 30 are operated to cause a small braking effect with the friction members contacting the disc rotor or drum, the front or rear wheels are more or less braked even while the brake pedal 34 is not operated.

To avoid a large degree of deceleration of the vehicle during the diagnosis, which gives a discomfort to the vehicle operator, the present embodiment is adapted such that the diagnosing routine for the front disc brakes 22 and the diagnosing routine for the rear drum brakes 32 are executed at different times.

The present embodiment is also adapted to execute the diagnosing routine while the vehicle is running at a low speed, that is, to inhibit the diagnosing routine during a high-speed running of the vehicle. In this respect, it is noted that the vehicle operator tends to more easily feel a deceleration of the vehicle during a high-speed running of the vehicle than during a low-speed running of the vehicle.

Figure 13:
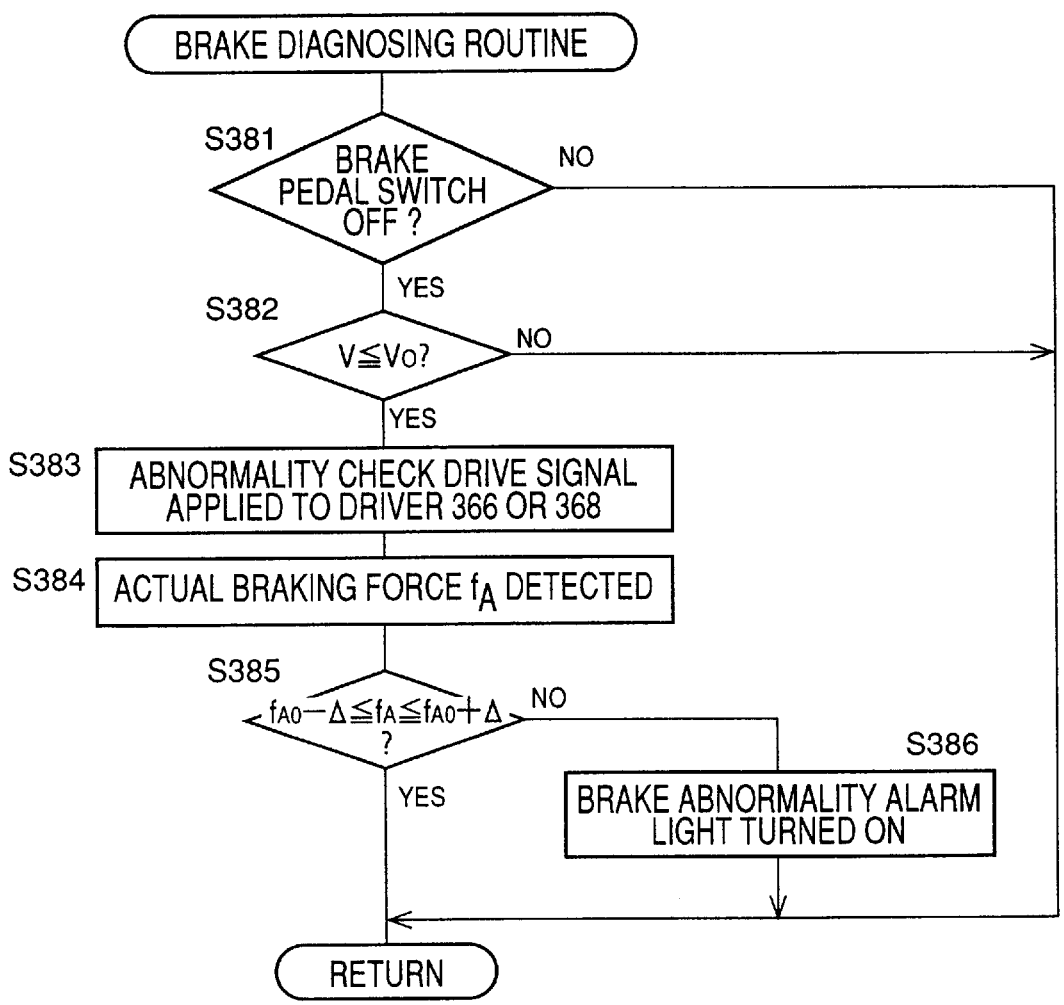
FIG. 13 is a flow chart illustrating a brake diagnosing routine stored in a ROM of a computer of an electronic control unit provided in a braking system according to a third embodiment of this invention.

The brake diagnosing routine according to the third embodiment is illustrated in the flow chart of FIG. 13. This routine is executed alternately for the front disc brakes 22 and the rear drum brakes 32. In other words, the front disc brake diagnosing routine and the rear drum brake diagnosing routine are executed at different times, such that one of the these routines is initiated only after the other routine is completed. However, the front disc brake diagnosing routine may be executed simultaneously for the front left and right wheels FL, RR. Similarly, the rear drum brake diagnosing routine may be executed simultaneously for the rear left and right wheels RL, RR.

The brake diagnosing routine of FIG. 13 is initiated with step S381 to determine whether the brake pedal switch 350 is OFF, namely, whether the brake pedal 34 is in the non-operated position. If a negative decision (NO) is obtained in step S381, one cycle of execution of the routine is terminated. IF the brake pedal switch 350 is OFF, the control flow goes to step S382.

Step S382 is provided to determine whether the vehicle running speed V detected by a vehicle speed sensor is equal to or lower than a predetermined upper limit $V_0$. The vehicle speed sensor may be a sensor for detecting the rotating speed of the output shaft of the automatic transmission 12, from which the vehicle speed can be calculated. Alternatively, the wheel speed sensors 362 may be used as the vehicle speed sensor. In this case, the vehicle speed is estimated on the basis of the output signals of the wheel speed sensors 362, which represent the rotating speeds of the wheels FL, FR, RL, RR. If the vehicle running speed V is higher than the upper limit $V_0$, a negative decision (NO) is obtained in step S382, and one cycle of execution of the present routine is terminated. If the vehicle speed V is equal to or lower than the upper limit $V_0$, an affirmative decision (YES) is obtained in step S382, and the control flow goes to step S383 in which the abnormality checking drive signal is applied to the driver 366 or 368. Step S383 is followed by step S384 to detect the braking force $f_A$. For the front disc brakes 22, the braking force sensor 116 is used to detect the braking force $f_A$. For the rear drum brakes 32, the brake position sensor 285 is used to determine the braking force $f_A$. Since there exists a known relationship between the braking force and the position of the lever 230, the braking force $f_A$ produced by the rear drum brakes 32 can be estimated on the basis of the position of the lever 230 detected by the brake position sensor 285.

Step S384 is followed by step S385 to determine whether the detected braking force $f_A$ falls within the allowable range between a lower limit (reference value $f_A{}^0$–half-tolerance value Δ) and an upper limit (reference $f_A{}^0$+half-tolerance value Δ). If the braking force $f_A$ does not fall within the allowable range, a negative decision (NO) is obtained in step S385, and the control flow goes to step S386 to turn on the brake abnormality alarm light 376, to inform the vehicle operator that the brake 22, 32 under examination is abnormal. If an affirmative decision (YES) is obtained in step S385, one cycle of execution of the present routine is terminated.

Figure 14:
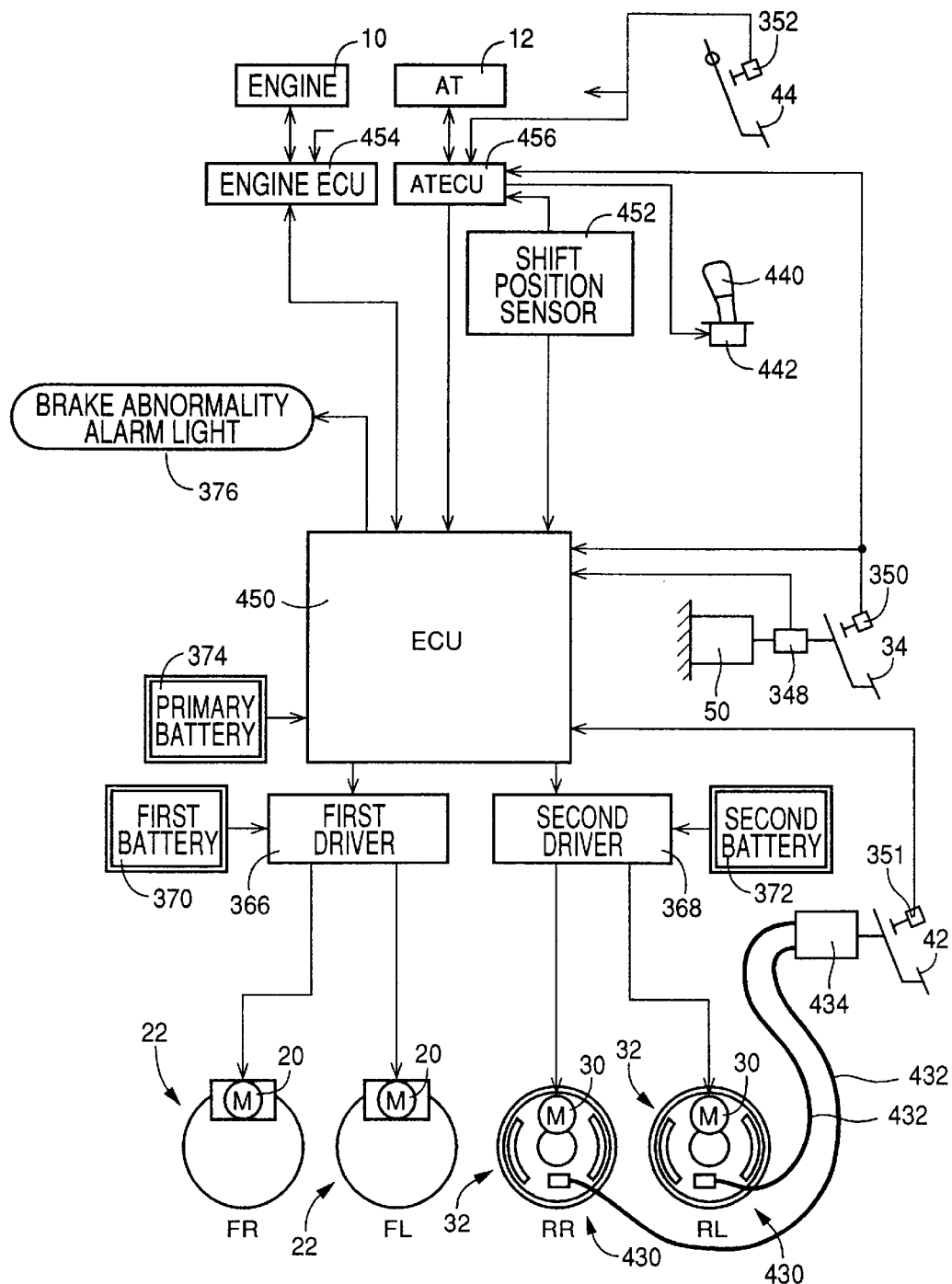
FIG. 14 is a schematic view showing a braking system adapted to practice a diagnosing method according to a fourth embodiment of this invention.
Figure 15:
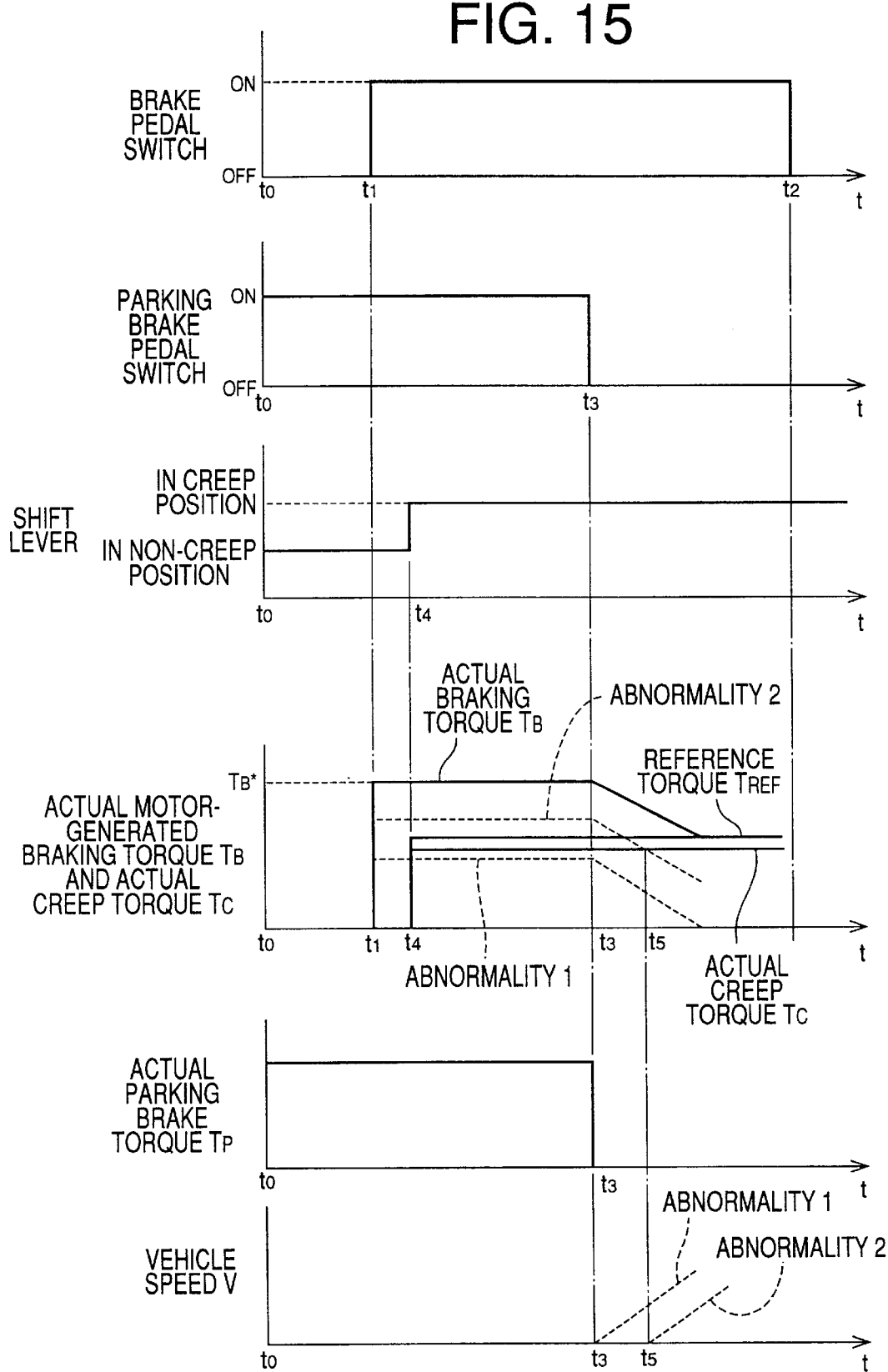
FIG. 15 is a graph for explaining the principle of operation of the brake diagnosing routine of FIG. 14.
Figure 16:
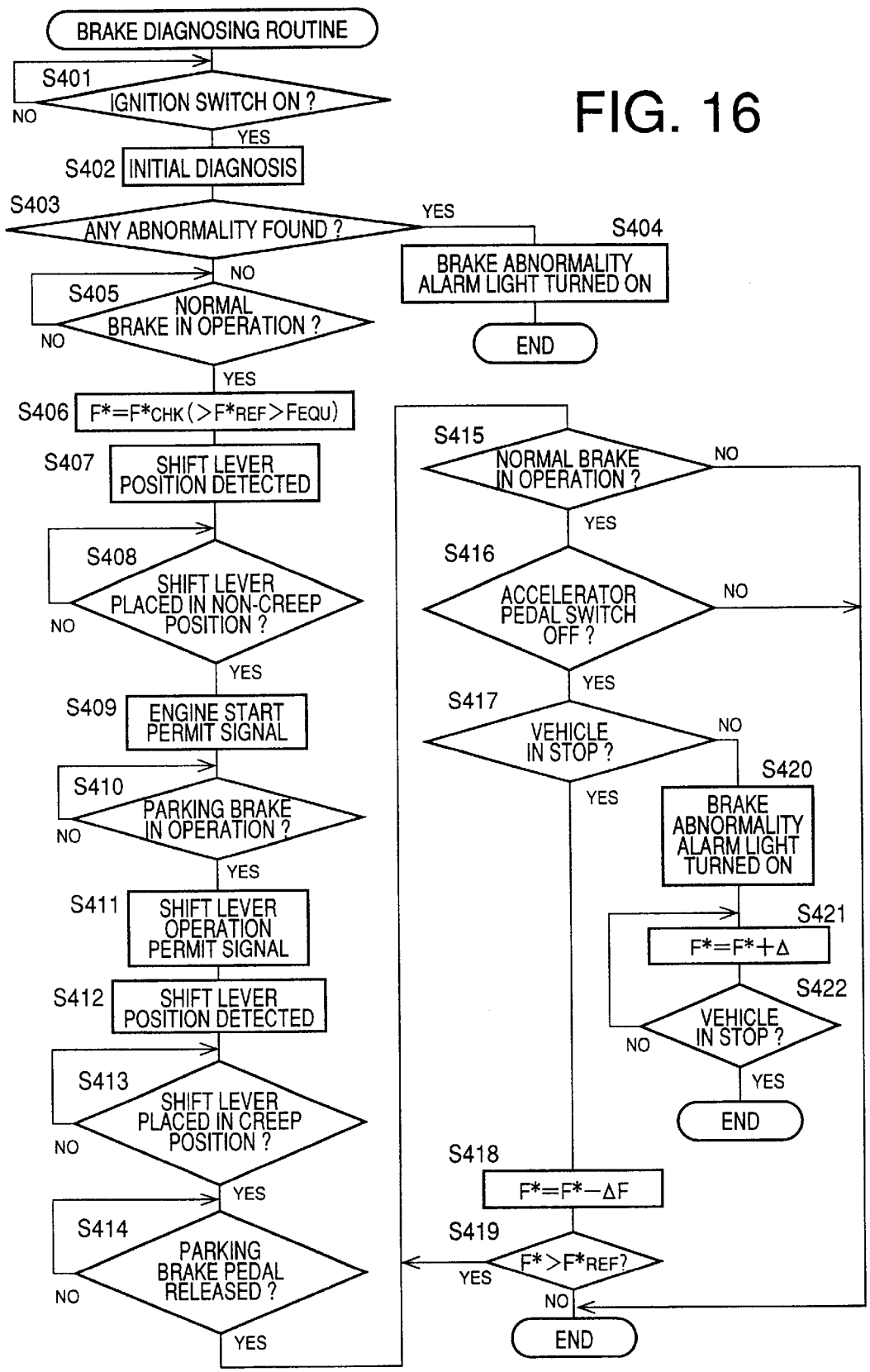
FIG. 16 is a flow chart illustrating a brake diagnosing routine stored in a ROM of a computer of an electronic control unit provided in the braking system of FIG. 14.

Referring next to FIGS. 14–16, there will be described a fourth embodiment of the present invention. The same reference signs as used in the first embodiment will be used in this fourth embodiment to identify the corresponding elements.

The braking system of the fourth embodiment of FIG. 14 includes parking brakes (auxiliary brakes) in the form of mechanically operated rear drum brakes 430 for the rear left and right wheels RL, RR, in place of the mechanically operated drum brakes 36 provided as the emergency brakes in the first embodiment. The lever 230 of each of these rear drum brakes 430 is connected to the parking brake pedal 42 through a cable 432 and a parking control 434. Upon operation of the parking brake pedal 42, the lever 230 is pivoted by the cable 432 so as to force the brake linings 216a, 216b onto the drum 204. The parking control 434 is provided to transmit the operating force acting on the parking brake pedal 42, to the lever 230 through the cable 434.

The vehicle equipped with the automatic transmission 12 has a shift control member in the form of a shift lever 440 for changing the speed ratio of the automatic transmission 12, and a shift lock mechanism 442 for preventing an erroneous operation of the shift lever 440. This shift lock mechanism 442 is adapted to prevent the shift lever 440 from being operated from a PARKING or NEUTRAL position to any one of driving positions DRIVE (D), LOW (L), SECOND (2) and REVERSE (R) unless the brake pedal 34 has been operated, even while the ignition switch is ON. Therefore, when the brake pedal 34 is operated to start the vehicle by shifting the shift lever 330 from the PARKING position to any driving position, for example, to the DRIVE position, the output of the engine 10 in an idling state is transmitted to the drive wheels (front wheels FL, FR, or rear wheels RL, RR, or both front and rear wheels) through the automatic transmission 12. In this case, a so-called "creep torque" for slowly starting the vehicle is transmitted from the engine 10 to the drive wheels while the braking torques generated by the motors 20, 30 are applied to the drive wheels with the brake pedal 34 being depressed. If the motor 20, 30 for each wheel is operated such that the braking torque generated by that motor is not smaller than the creep torque of the drive wheels, the corresponding brake 22, 32 can be diagnosed by determining if the vehicle remains stopped with the braking torque when the shift lever 440 is shifted to the driving position. That is, the brake 22, 32 is considered to be normal if the vehicle remains stopped. Thus, the present embodiment is adapted to diagnose the brake 22, 32 for each drive wheel for abnormality, utilizing the creep torque generated upon shifting of the shift lever 440 from the PARKING position to any driving position with the brake pedal 34 being operated.

The present embodiment is adapted to diagnose only the brake for each of the drive wheels, utilizing the total creep torque produced by the drive wheels. However, each of the brakes for the non-drive or driven wheels can be diagnosed utilizing the total creep torque of the drive wheels. Further, the brakes of the drive wheels or the brakes of the non-drive wheels may be simultaneously diagnosed with the braking torques being simultaneously applied to the respective drive wheels or non-drive wheels. In this case, the vehicle is started if the total braking torque is smaller than the total creep torque of the drive wheels. Alternatively, the brakes of all of the four wheels may be simultaneously diagnosed. In these two cases, it is impossible which one of the brakes is abnormal.

With the shift lever 440 placed in the PARKING or NEUTRAL position, the output of the engine 10 is not transmitted to the drive wheels, and no creeping of the vehicle takes place. For this reason, the PARKING and NEUTRAL positions will be referred to as "non-creep positions" of the shift lever 440, while the driving positions DRIVE, LOW, SECOND and REVERSE will be referred to as "creep positions".

In the present fourth embodiment, an electronic control unit (brake ECU) 450 is provided for controlling the motors 20, 30. This electronic control unit 450 is similar to the electronic control unit 330 of the first embodiment of FIG. 1. To the electronic control unit 450, there are connected to the first and second drivers 366, 368, primary battery 374, brake pedal switch 350, parking brake pedal switch 351, operating force sensor 348 and brake abnormality alarm light 376. Also connected to the electronic control unit 450 are a shift position sensor 452 for detecting the presently selected position of the shift lever 440, an electronic control unit (engine ECU) 454 for controlling the output of the engine 10, and an electronic control unit (ATECU) 456 for controlling a shifting action of the automatic transmission 12.

The brake diagnosing routine in the present fourth embodiment will be described.

To begin with, this routine will be briefly explained.

Referring to the time chart of FIG. 15, there are shown changes of various parameters relating to the diagnosis of the brakes 22, 32 upon starting of the vehicle.

The brake pedal switch 350 is OFF at point of time t0, and is subsequently turned ON at point of time t1. The switch 350 is then turned OFF at point of time t2. The parking brake pedal switch 351 is ON at the point of time t0, and is turned OFF at point of time t3 between the points of time t1 and t2. The shift lever 440 is placed in the non-creep position at the point of time t0, and is shifted to the creep position at point of time t4 between the points of time t1 and t3.

Upon operation of the brake pedal 34 at the point of tine t1, the abnormality checking drive signal is applied to the driver 366, 368 such that the brake 22, 32 generates a target braking torque $T_B$* which is larger than a predetermined reference torque $T_{REF}$ which is equal to or larger than the actual total creep torque $T_C$ produced by the engine 10 in the idling state. As a result, the actual braking torque $T_B$ increases to the target value $T_B$* at the point of time t1 if the motor 20, 30 is normally functioning. The actual total creep torque $T_C$ is zero at the point of time t1, and increases from zero at the point of time t4 at which the shift lever 440 is shifted to any creep position. A parking brake torque $T_P$ which is larger than zero is generated by the parking brake 430 during a period between the points of time t0 and t3. The braking brake 430 is released at the point of time t3.

After the parking brake torque $T_P$ generated by the parking brake 430 is zeroed at the point of time t3, only the actual creep torque $T_C$ for starting the vehicle is applied to the drive wheels while only the actual braking torque $T_B$ generated by operation of the motor 20, 30 under examination is applied to the corresponding wheel. In this state, whether the vehicle is started depends upon a difference between the total actual creep torque $T_C$ of the drive wheels and the actual braking torque $T_B$ generated by the motor under examination. Described more specifically, upon application of the abnormality checking drive signal to the driver 366, 368 so as to achieve the target braking torque $T_B$*, the vehicle is not started if the motor 20, 30 is normal, since the actual braking torque $T_B$ is equal to the target value $T_B$* which is larger than the actual creep torque $T_C$. However, if the actual braking torque $T_B$ does not increase to the actual creep torque $T_C$ due to some abnormality (first abnormality) of the motor 20, 30 upon application of the abnormality drive signal to the driver 366, 368, the vehicle is started at the point of time t3 at which the parking brake 430 is released. This abnormality is indicated as "ABNORMALITY 1" in the time chart of FIG. 15. The present embodiment is adapted to perform the checking as to whether the vehicle is started, at the point of time t3 or thereafter. If the vehicle is started, the motor 20, 30 is diagnosed to be abnormal.

If the actual braking torque $T_B$ increases to a value larger than the actual creep torque $T_C$ but does not increases to the target value $T_B$* due to some abnormality (second abnormality indicated as "ABNORMALITY 2" in FIG. 15) of the motor 20, 30 upon application of the abnormality drive signal to the driver 366, 368, the vehicle remains stopped until the point of time t3. If the abnormality checking drive signal applied to the driver 366, 368 is controlled to continuously reduce the braking torque $T_B$ from the target value $T_B$* such that the braking torque $T_B$ becomes smaller than the total creep torque $T_C$ at the point of time t5, the vehicle is started at this point of time t5, as indicated in FIG. 15. In view of this, the present embodiment is adapted to control the abnormality checking drive signal so as to to continuously reduce the braking torque $T_B$ after the point of time t3 such that the braking torque $T_B$ generated by the motor 20, 30 in question falls below the total creep torque TC at the point of time t5. In this arrangement, the motor 20, 30 is determined to be abnormal if the vehicle is started at the point of time t5.

Referring to the flow chart of FIG. 16, the brake diagnosing routine according to the present fourth embodiment will be described in detail. A control program for this diagnosing routine is stored in the ROM of the computer of the electronic control unit 450, and is executed by its CPU.

The present brake diagnosing routine is executed repeatedly for each of the drive wheels in a predetermined order. Each cycle of execution of the routine is initiated with step S401 to determine whether the ignition switch is ON. As long as a negative decision (NO) is obtained in step S401, this step S401 is repeatedly implemented. If an affirmative decision (YES) is obtained in step S401, the control flow goes to step S402 to perform an initial diagnosis similar to that in step S102 of the flow chart of FIG. 7. Step S402 is followed by step S403 to determine whether any abnormality of the brake 22, 32 under examination was found in step S402. If an affirmative decision (YES) is obtained in step S403, the control flow goes to step S404 to turn on the brake abnormality alarm light 376, informing the vehicle operator that the brake 22, 32 is abnormal. In this case, one cycle of execution of the routine is terminated. The routine is again initiated when the ignition switch is turned on after it is once turned off.

If no abnormality of the brake 22, 32 was found in step S402, a negative decision (NO) is obtained in step S403, and the control flow goes to step S405 to determine whether a normal brake is applied to the vehicle. This determination may be effected by determining whether the brake pedal switch 350 is in the ON state, or whether the brake pedal switch 350 is in the ON state while the output of the operating force sensor 348 (or of the operating stroke sensor) is not zero. As long as a negative decision (NO) is obtained in step S405, this step is repeatedly implemented. If an affirmative decision (YES) is obtained in step S405, the control flow goes to step S406.

In step S406, the abnormality checking drive signal is applied to the driver 366, 368 to activate the motor (of the drive wheel) under examination such that a commanded or target pressing force F* for forcing the friction members onto the disc rotor 104 or drum 204 is equal to a predetermined abnormality checking force $F^*_{CHK}$, which is larger than a reference pressing force $F^*_{REF}$. This reference pressing force $F^*_{REF}$ is larger than an equivalent pressing force $F_{EQU}$, which is substantially equal to the total creep torque $T_C$ transmitted from the engine 10 to the drive wheels.

Step S406 is followed by step S407 in which the presently selected position of the shift lever 440 is detected by the shift position sensor 452. Step S407 is followed by step S408 to determine whether the detected position of the shift lever 440 is the non-creep position (PARKING or NEUTRAL position). As long as a negative decision (NO) is obtained in step S408, this step is repeatedly implemented. If an affirmative decision (YES) is obtained in step S408, the control flow goes to step S409.

In step S409, a signal which permits the engine 10 to be started by the vehicle operator is generated. Step S409 is followed by step S410 to determine whether the parking pedal 42 is in the operated position, that is, whether a parking brake is applied to the vehicle by the parking brakes 430. This determination is made by determining whether the parking pedal switch 351 is ON. As long as a negative decision (NO) is obtained in step S410, this step is repeatedly implemented. If an affirmative decision (YES) is obtained in step S410, the control flow goes to step S411.

In step S411, a signal permitting an operation of the shift lever 440 by the vehicle operator is generated. Step S411 is followed by step S412 to detect the presently selected position of the shift lever 440. Then, the control flow goes to step S413 to determine whether the shift lever 440 is placed in any one of the creep positions ("D", "L", "2" or "R"), that is, whether the shift lever 440 has been shifted from the non-creep position to the creep position. As long as a negative decision (NO) is obtained in step S413, this step is repeatedly implemented. If an affirmative decision (YES) is obtained in step S413, the control flow goes to step S414.

Step S414 is provided to determine whether the parking brake pedal 42 has been released, that is, whether the parking brakes 430 have been returned to the non-operated position. This determination may be made by determining whether the parking pedal switch 351 has been turned from ON to OFF. As long as a negative decision (NO) is obtained in step S414, this step is repeatedly implemented. If an affirmative decision (YES) is obtained in step S414, the control flow goes to step S415.

Step S415 is provided to determine whether the normal brake is still applied. If the normal brake has been released, a negative decision (NO) is obtained in step S415, and one cycle of execution of the present routine is terminated. If an affirmative decision (YES) is obtained in step S415, the control flow goes to step S416.

Step S416 is provided to determine whether the accelerator pedal switch 352 is in the OFF state, that is, whether the accelerator pedal 44 is in the OFF state. If the accelerator pedal 44 is in the operated position, a negative decision (NO) is obtained in step S416, one cycle of execution of the routine is terminated. If the accelerator pedal 44 is in the non-operated position, an affirmative decision (YES) is obtained in step S416, and the control flow goes to step S417.

Step S417 is provided to determine whether the vehicle remains stopped. This determination is effected by determining whether the rotating speed of each wheel detected by the corresponding wheel speed sensor 362 is substantially zero. If an affirmative decision (YES) is obtained in step S417, the control flow goes to step S418 in which the commanded pressing force F* is decremented by a predetermined amount ΔF. That is, the abnormality checking drive signal applied to the appropriate driver 366, 368 is changed so as to reduce the output of the motor 20, 30 under examination, that is, to reduce the braking torque $T_B$ generated by the motor 20, 30. Step S418 is followed by step S419 to determine whether the commanded pressing force F* is still larger than the reference pressing force $F^*_{REF}$. If an affirmative decision (YES) is obtained in step S419, the control flow goes back to step S415. If the commanded pressing force F* has been reduced to the reference pressing force $F^*_{REF}$, during repeated implementation of steps S415–S419, a negative decision (NO) is obtained in step S419, and one cycle of execution of this routine is terminated. In this case where the vehicle remains stopped even after the commanded pressing force F* has been reduced to the reference pressing force $F^*_{REF}$, the brake 22, 32 under examination is determined or diagnosed to be normal, and the brake abnormality alarm light 378 is not turned on.

If the vehicle is started, a negative decision (NO) is obtained in step S417, and the control flow goes to step S420 to turn on the brake abnormality alarm light 378, informing the vehicle operator that the brake 22, 32 in question is abnormal or defective. Step S420 is followed by step S421 in which the commanded pressing force F* is incremented by the predetermined amount ΔF. Step S421 is followed by step S422 to determine whether the vehicle is stopped. If a negative decision (NO) is obtained in step S421. Thus, where the brake 22, 32 is found abnormal, the commanded pressing force F* is incremented by the predetermined amount ΔF, to try to check if the vehicle can be stopped, by increasing the commanded pressing force F*. If the vehicle is stopped, an affirmative decision (YES) is obtained in step S422, and one cycle of execution of the present routine is terminated.

Figure 9:
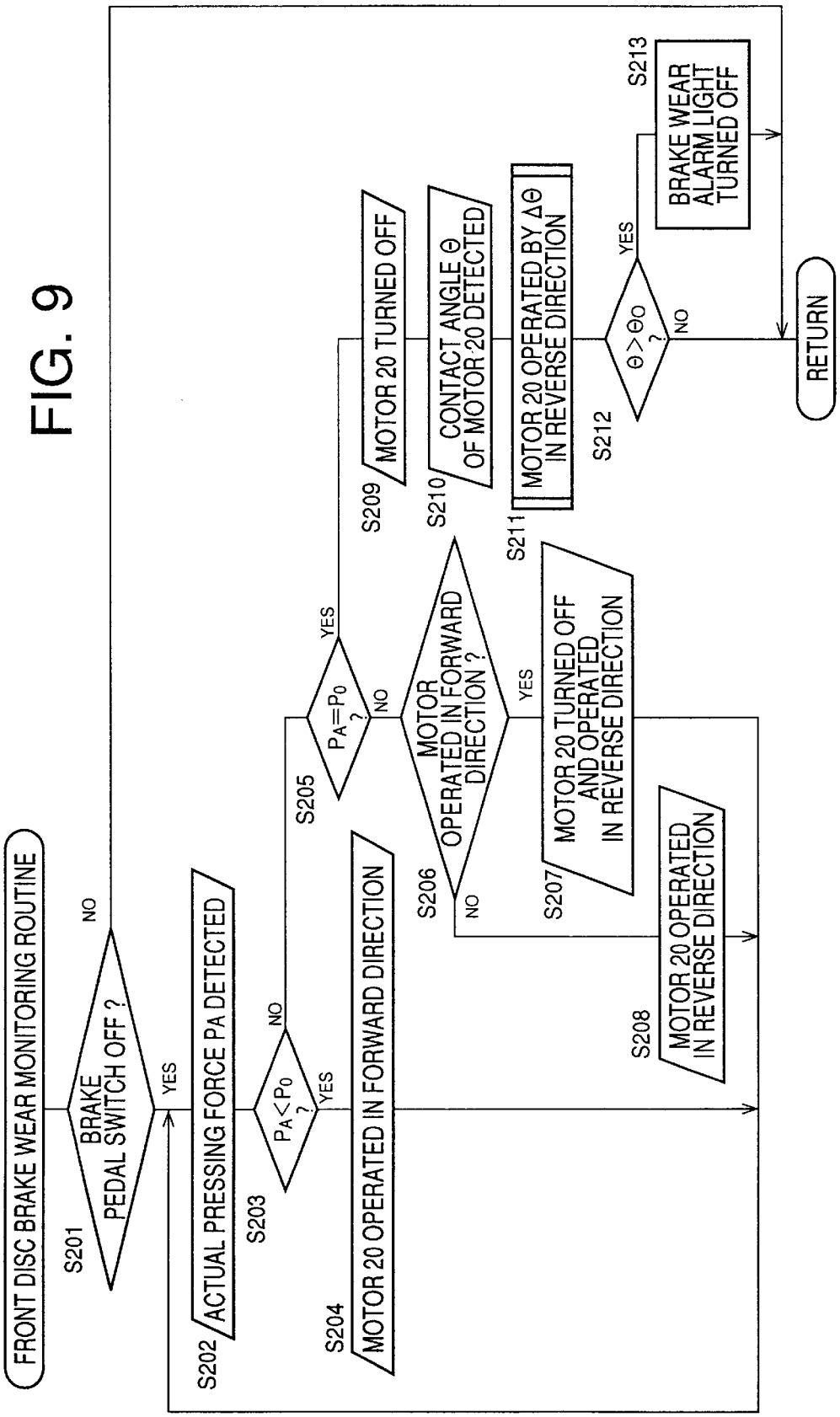
FIG. 9 is a flow chart illustrating a front disc brake wear monitoring routine also stored in the ROM.

In the present fourth embodiment, too, the normal brake control routine of FIG. 5, front disc brake wear monitoring routine of FIG. 9 and rear drum brake wear monitoring routine of FIG. 10 are executed as in the first embodiment. However, the brake diagnosing routine of FIG. 16 is executed prior to the normal brake control routine. That is, the execution of the normal brake control routine is inhibited while the brake diagnosing routine of FIG. 16 is executed.

In the present fourth embodiment, the control flow of the routine of FIG. 16 does not goes to steps S417–S422 to effect the diagnosis of the brake 22, 32 if the affirmative decision (YES) is not obtained in steps S415 and S416. To effect the diagnosis in this case, it is desirable to execute a front disc brake or rear drum brake diagnosing routine as executed in the first embodiment, as well as the routine of FIG. 16, or alternatively, only if the diagnosis (in steps S417–S422) is not effected in the routine of FIG. 16.

Where all of the front left and right wheels FL, FR and the rear left and right wheels RL, RR are used as the drive wheels, the brake diagnosing routine of FIG. 16 is executed for each of these four drive wheels. Where the front wheels FL, FR or the rear wheels RL, RR are used as the drive wheels, the routine of FIG. 16 is executed for each of these two drive wheels. Where the front wheels are used as the drive wheels, it is possible to execute the routine of FIG. 16 for each of these two front drive wheels, and execute the rear drum brake diagnosing routine of FIG. 10 for the rear wheels. In this case, the steps S254 and S258 in the routine of FIG. 10 are desirably modified so as to determine whether the parking brake pedal switch 252 is in the OFF state.

The present fourth embodiment may be modified such that the parking brake pedal 42 may be used as the emergency brake pedal as in the first embodiment. In this case, the mechanically operated drum brakes 430 serve as the emergency brakes.

Then, a fifth embodiment of this invention will be described. Since the hardware arrangement of this fifth embodiment is identical with that of the fourth embodiment, the same reference signs as used in the fourth embodiment will be used in the fifth embodiment, to identify the corresponding elements. Redundant description of these elements will not be provided, and only the software arrangement of the fifth embodiment will be explained.

When the accelerator pedal 44 is released during running of the vehicle, the vehicle is braked by the engine 10. As a result, an engine brake torque is applied to the drive wheels, and the vehicle and the vehicle wheels are decelerated. The drive wheels are decelerated directly by the engine brake torque, while the non-drive or driven wheels are decelerated indirectly through the deceleration of the vehicle body. Accordingly, the engine brake torque is more accurately reflected by the deceleration of the drive wheels, than by the deceleration of the non-drive wheels. Thus, the vehicle operator may feel deceleration of the vehicle body during running of the vehicle without a normal brake application. On the other hand, the engine brake torque can be reduced by increasing the idling speed of the engine 10. Therefore, the diagnosis of the motor 20, 30 can be achieved by operating the motor 20, 30 and at the same time reducing the engine brake torque ("drive-source-dependent braking torque") during engine brake application such that the braking torque generated by the motor 20, 30 is substantially equal to an amount of reduction of the engine brake torque by the reduction of the engine idling speed. In this case, the motor 20, 30 can be operated for the diagnosis, without a significant increase in the deceleration value of the vehicle body and the vehicle wheels. If the motor 20, 30 is abnormal, the braking torque generated by the motor is smaller than the amount of reduction of the engine brake torque, so that the deceleration values of the vehicle body and vehicle wheels is made lower than those where the motor 20, 30 is normal.

In the light of the above fact, the present fifth embodiment is adapted to increase the idling speed of the engine 10 during engine brake application without operations of the accelerator pedal 44 and the brake pedal 34, so as to reduce the engine brake torque, and at the same time apply the abnormality checking drive signal for activating the motor 20, 30 of each drive wheel such that the braking torque generated by the activated motor 20, 30 is substantially equal to the amount of reduction of the engine brake torque. In this state, the actual deceleration value of the drive wheels (or of the vehicle body) is detected, and compared with a predetermined threshold value, to determine that the motor 20, 30 is abnormal, if the detected deceleration value is lower than the threshold value.

The amount of reduction of the engine brake torque may be determined to zero the engine brake torque or to reduce it by a predetermined about. In the former case, the motor 20, 30 is activated so as to generate the braking torque equal to the engine brake torque before its reduction. In the latter case, the braking torque generated by the activated motor 20, 30 is smaller than the engine brake torque before its reduction.

To effect the above diagnosis, a brake diagnosing routine illustrated in the flow chart of FIG. 17 is executed according to a control program stored in the ROM of the electronic control unit 450.

The present brake diagnosing routine is repeatedly executed for each of the drive wheels in a predetermined order. Each cycle of execution of the routine is initiated with step S501 to determine whether the accelerator pedal switch 352 is in the OFF state, that is, whether the accelerator pedal 44 is in the non-operated position. As long as a negative decision (NO) is obtained in step S501, this step is repeatedly implemented. If an affirmative decision (YES) is obtained in step S501, the control flow goes to step S502.

Step S502 is provided to determine whether the the brake pedal 34 is in the non-operated position. This determination may be effected on the basis of the output signal of the brake pedal switch 350 or the operating force sensor 348. As long as a negative decision (NO) is obtained in step S502, steps S501 and S502 are repeatedly implemented. If an affirmative decision (YES) is obtained in step S502, the control flow goes to step S503.

In step S503, a signal for increasing the idling speed of the engine 10 is generated. In the present embodiment, the idling speed increasing signal is generated so as to substantially zero the engine brake torque. Step S503 is followed by step S504 in which the abnormality checking drive signal is applied to the corresponding driver 366, 368 to activate the motor 20, 30 of the drive wheel under examination, such that the braking torque generated by the activated motor is substantially equal to the amount of reduction of the engine brake torque which is obtained by increasing the idling speed of the engine 10. Then, the control flow goes to step S505 in which a rotating speed $V_w$ of each drive wheel is detected by the corresponding wheel speed sensor 362. Step S505 is followed by step S506 in which a deceleration value $GV_w$ of the drive wheel is calculated, by subtracting the speed $V_w$ detected in the last control cycle from the speed $V_w$ detected in the present control cycle. Then, the control flow goes to step S507 to determine whether the calculated deceleration value $GV_w$ of the drive wheel is lower than a predetermined threshold $G_0$. If a negative decision (NO) is obtained in step S507, the control flow goes to step S508 in which a signal for lowering the idling speed of the engine 10 to the nominal value is generated. Step S509 is then implemented to apply a signal to the driver 366, 368 so as to operate the motor 20, 30 to its original non-braking position. Thus, one cycle of execution of the routine of FIG. 17 is terminated. In this case, the motor 20, 30 is determined to be normal, and the brake abnormality alarm light 376 is not turned on.

If the deceleration value $GV_w$ of the drive wheel in question is lower than the threshold $G_0$, an affirmative decision (YES) is obtained in step S507, and the control flow goes to step S510 in which the brake abnormality alarm light 376 is turned on, to informing the vehicle operator that the motor 20, 30 is abnormal.

Step S510 is followed by steps S508 and S509, and one cycle of execution of the routine is terminated.

It is noted that the engine brake torque is not constant, but may vary depending upon the vehicle running speed when the accelerator pedal 44 is released. In the present embodiment, therefore, the idling speed increasing signal and the abnormality checking drive signal are determined depending upon the detected vehicle running speed, and according to a relationship between the vehicle running speed and the engine brake torque, a relationship between the engine brake torque and the idling speed increasing signal, and a relationship between the braking torque and the abnormality checking drive signal. Those relationships are stored in the ROM of the electronic control unit 454.

While the several presently preferred embodiments of this invention have been described above in detail by reference to the accompanying drawings, it is to be understood that the present invention may be embodied with various changes, modifications and improvements, which may occur to those skilled in the art, without departing from the spirit and scope of the invention defined in the following claims.

What is claimed is:

1. A method of diagnosing an electrically operated brake for abnormality thereof in an automotive vehicle wherein the brake includes an electric motor as a drive source for generating a friction force upon an operation of a manually operated brake operating member, to brake a wheel of the vehicle, said method comprising the steps of:

applying an abnormality checking drive signal to said electric motor to operate said electric motor while said manually operated brake operating member is placed in a non-operated position;

detecting a quantity relating to an output of said electric motor while said abnormality checking drive signal is applied to said electric motor; and determining that said electrically operated brake is abnormal, if the detected quantity does not normally correspond to a magnitude of said abnormality checking drive signal.

2. A method according to claim 1, wherein the magnitude of said abnormality checking drive signal is determined such that said electrically operated brake does not apply a braking torque to said wheel.

3. A method according to claim 1, wherein the magnitude of said abnormality checking drive signal is determined such that said electrically operated brake applies a braking torque to said wheel.

4. A method according to claim 1, wherein said abnormality checking device signal is applied to said electric motor so as not to cause a substantial change in a running condition of the automotive vehicle.

5. A method according to claim 1, wherein said electrically operated brake is provided for each of a front wheel and a rear wheel of the automotive vehicle, and said abnormality drive signal is applied to said electrically operated brakes for said front and rear wheels, at different times.

6. A method according to claim 1, wherein the automotive vehicle has a drive power source, and a manually operated vehicle accelerating member for increasing an output of said drive power source to thereby accelerate said automotive vehicle, said drive power source applying a drive-source-dependent braking torque to said wheel to thereby decelerate the automotive vehicle when said manually operated vehicle accelerating member is operated to a non-operated position thereof, said method further comprising a step of controlling said drive power source when said manually operated vehicle accelerating member is operated to said non-operated position while said manually operated brake operating member is placed in said non-operated position, so that an actual value of the output of said drive power source is reduced to be smaller than a nominal value while said manually operated vehicle accelerating member is placed in said non-operated position, and wherein said step of applying an abnormality checking drive signal to said electric motor comprises determining the magnitude of said said abnormality checking drive signal such that a braking torque generated by said electrically operated brake with the drive signal applied thereto is substantially equal to an amount of reduction of said drive-source-dependent braking torque, and said step of detecting a quantity relating to an output of said electric motor comprises detecting a value of deceleration of the automotive vehicle while said drive signal is applied to said electric motor and while said vehicle accelerating member is placed in said non-operated position, said step of determining that said electrically operated brake is abnormal comprising determining that said electrically operated brake is abnormal, if the detected value of deceleration is smaller than a predetermined threshold value.

7. A method according to claim 1, wherein the automotive vehicle has an engine, and a manually operated vehicle accelerating member for increasing an output of said engine to thereby accelerate said automotive vehicle, said engine applying an engine braking torque to said wheel to thereby decelerate the automotive vehicle when said manually operated vehicle accelerating member is operated to a non-operated position thereof, said method further comprising a step of controlling said engine when said manually operated vehicle accelerating member is operated to said non-operated position while said manually operated brake operating member is placed in said non-operated position, so that an actual value of the output of said engine is reduced to be smaller than a nominal value while said manually operated vehicle accelerating member is placed in said non-operated position, and wherein said step of applying an abnormality checking drive signal to said electric motor comprises determining the magnitude of said said abnormality checking drive signal such that a braking torque generated by said electrically operated brake with the drive signal applied thereto is substantially equal to an amount of reduction of said engine braking torque, and said step of detecting a quantity relating to an output of said electric motor comprises detecting a value of deceleration of the automotive vehicle while said drive signal is applied to said electric motor and while said vehicle accelerating member is placed in said non-operated position, said step of determining that said electrically operated brake is abnormal comprising determining that said electrically operated brake is abnormal, if the detected value of deceleration is smaller than a predetermined threshold value.

8. A method according to claim 1, wherein said manually operated brake operating member is used as a normal brake operating member for activating said electrically operated brake as a normal brake, said automotive vehicle further including a mechanically operated auxiliary brake, and a manually operated auxiliary brake operating member for activating said auxiliary brake, and wherein said step of determining that said electrically operated brake is abnormal if the detected quantity does not normally correspond to a magnitude of said abnormality checking drive signal is inhibited when said mechanically operated auxiliary brake is activated.

9. A method of diagnosing an electrically operated brake for abnormality thereof in an automotive vehicle having a drive power source, a manually operated vehicle accelerating member for increasing an output of the drive power source for accelerating the automotive vehicle, a manually operated normal brake operating member for operating an electric motor of said electrically operated brake to generate a friction force for braking a wheel of the automotive vehicle, a parking brake, and a manually operated parking brake operating member for activating said parking brake to apply a parking brake to said wheel, and wherein a creep torque is applied from said drive power source to said wheel for slowly starting said automotive vehicle while said vehicle accelerating member is placed in a non-operated position, said method comprising the steps of:

applying an abnormality checking drive signal to said electric motor of said electrically operated brake when the automotive vehicle is at a stop with said automotive vehicle being braked by said electrically operated brake and said parking brake while said creep torque is applied to said wheel, said driving signal having a magnitude which is determined regardless of an amount of operation of said normal brake operating member such that a braking force generated by said electrically operated brake is larger than said creep torque; and determining that said electrically operated brake is abnormal, if said automotive vehicle is started when said parking brake operating member has been operated to a non-operated position thereof while said normal brake operating member is held in an operated position thereof.

10. A method according to claim 9, wherein said step of determining that said electrically operated brake is abnormal is inhibited while said manually operated vehicle accelerating member is in an operated position thereof.

11. A method according to claim 9, further comprising the steps of:

applying another abnormality checking drive signal to said electric motor of said electrically operated brake while said manually operated normal brake operating member is placed in a non-operated position thereof;

detecting a quantity relating to an output of said electric motor while said another abnormality checking drive signal is applied to said electric motor; and determining that said electrically operated brake is abnormal, if the detected quantity does not normally correspond to a magnitude of said another abnormality checking signal.

12. A method according to claim 11, wherein said steps of applying, detecting and determining recited in claim 11 are effected only if said electrically operated brake is determined to be abnormal in said step of determining recited in claim 9.

13. A braking system for an automotive vehicle comprising an electrically operated braking device including (a) a manually operated brake operating member, (b) a braking member having a rotor rotating with a wheel of the vehicle and a friction member which is forced onto said rotor to brake said wheel, (c) an electric motor, (d) a drive force transmitting device for transmitting a drive force of said electric motor to said friction member, (e) an operation amount sensor for detecting an amount of operation of said brake operating member, and (f) a motor controller for controlling said electric motor on the basis of an output of said operation amount sensor, said braking system further comprising:

a diagnosing device for applying an abnormality checking drive signal to said electric motor to operate said electric motor while said manually operated brake operating member is placed in a non-operated position, detecting a quantity relating to an output of said electric motor while said abnormality checking drive signal is applied to said electric motor, and determining that said electrically operated braking device is abnormal, if the detected quantity does not normally correspond to a magnitude of said abnormality checking drive signal.

14. A braking system according to claim 13, wherein the magnitude of said abnormality checking drive signal is determined so as to prevent a substantial change in a running condition of the automotive vehicle.

15. A braking system according to claim 13, wherein said electrically operated braking device is provided for each of a front wheel and a rear wheel of the automotive vehicle, and said diagnosing device applies said abnormality checking drive signal to said electrically operated braking devices for said front and rear wheels, at different times.

16. A braking system according to claim 13, wherein the automotive vehicle has a drive power source, and a manually operated vehicle accelerating member for increasing an output of said drive power source to thereby accelerate said automotive vehicle, said drive power source applying a drive-source-dependent braking torque to said wheel to thereby decelerate the automotive vehicle when said manually operated vehicle accelerating member is operated to a non-operated position thereof, and wherein said diagnosing device controls said drive power source when said manually operated vehicle accelerating member is operated to said non-operated position while said manually operated brake operating member is placed in said non-operated position, so that an actual value of said drive-source-dependent braking torque is reduced to be smaller than a nominal value while said manually operated vehicle accelerating member is placed in said non-operated position, said diagnosing device determines the magnitude of said said abnormality checking drive signal such that a braking torque generated by said electrically operated brake with the drive signal applied thereto is substantially equal to an amount of reduction of said drive-source-dependent braking torque, said diagnosing device detecting a value of deceleration of the automotive vehicle while said drive signal is applied to said electric motor and while said vehicle accelerating member is placed in said non-operated position, and determining that said electrically operated brake is abnormal, if the detected value of deceleration is smaller than a predetermined threshold value.

17. A braking system according to claim 13, wherein the automotive vehicle has an engine, and a manually operated vehicle accelerating member for increasing an output of said engine to thereby accelerate said automotive vehicle, said engine applying an engine braking torque to said wheel to thereby decelerate the automotive vehicle when said manually operated vehicle accelerating member is operated to a non-operated position thereof, and wherein said diagnosing device controls said engine when said manually operated vehicle accelerating member is operated to said non-operated position while said manually operated brake operating member is placed in said non-operated position, so that an actual value of said engine braking torque is reduced to be smaller than a nominal value while said manually operated vehicle accelerating member is placed in said non-operated position, said diagnosing device determining the magnitude of said said abnormality checking drive signal such that a braking torque generated by said electrically operated brake with the drive signal applied thereto is substantially equal to an amount of reduction of said engine braking torque, said diagnosing device detecting a value of deceleration of the automotive vehicle while said drive signal is applied to said electric motor and while said vehicle accelerating member is placed in said non-operated position, and determining that said electrically operated brake is abnormal, if the detected value of deceleration is smaller than a predetermined threshold value.

18. A braking system according to claim 13, wherein said manually operated brake operating member is used as a normal brake operating member for activating said electrically operated braking device as a normal braking device, said braking system further including a mechanically operated auxiliary braking device, and a manually operated auxiliary brake operating member for activating said auxiliary braking device, and wherein said diagnosing device inhibits a determination as to whether said electrically operated braking device is abnormal, when said mechanically operated auxiliary brake is activated.

19. A braking system for an automotive vehicle, comprising a drive power source, a manually operated vehicle accelerating member for increasing an output of the drive power source for accelerating the automotive vehicle, an electrically operated brake, a manually operated normal brake operating member for operating an electric motor of said electrically operated brake to generate a friction force for braking a wheel of the automotive vehicle, a parking brake, and a manually operated parking brake operating member for activating said parking brake to apply a parking brake to said wheel, said automotive vehicle being arranged such that a creep torque is applied from said drive power source to said wheel for slowly starting said automotive vehicle while said vehicle accelerating member is placed in a non-operated position thereof, said braking system further comprising:

a diagnosing device for applying an abnormality checking drive signal to said electric motor of said electrically operated brake when the automotive vehicle is at a stop with said automotive vehicle being braked by said electrically operated brake and said parking brake while said creep torque is applied to said wheel, said driving signal having a magnitude which is determined regardless of an amount of operation of said normal brake operating member such that a braking force generated by said electrically operated brake is larger than said creep torque, said diagnosing device determining that said electrically operated brake is abnormal, if said automotive vehicle is started when said parking brake operating member has been operated to a non-operated position thereof while said normal brake operating member is held in an operated position thereof.

* * * * *

UNITED STATES PATENT AND TRADEMARK OFFICE
CERTIFICATE OF CORRECTION

PATENT NO. : 6,158,822
DATED : December 9, 2000
INVENTOR(S) : Kenji Shirai et al.

Page 1 of 1

It is certified that error appears in the above-identified patent and that said Letters Patent is hereby corrected as shown below:

Column 17,
Line 35, change "The" to -- To the --; before "also" insert -- there are --; after "connected" delete "to the".

Signed and Sealed this

Fourth Day of September, 2001

Attest:

*Nicholas P. Godici*

NICHOLAS P. GODICI
*Acting Director of the United States Patent and Trademark Office*

*Attesting Officer*